United States Patent
Kobayashi

(10) Patent No.: US 7,620,255 B2
(45) Date of Patent: Nov. 17, 2009

(54) IMAGE PROCESSOR AND IMAGE PROCESSING PROGRAM FOR BINARY PROCESSING

(75) Inventor: Makoto Kobayashi, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 737 days.

(21) Appl. No.: 11/473,462

(22) Filed: Jun. 22, 2006

(65) Prior Publication Data

US 2006/0290989 A1 Dec. 28, 2006

(30) Foreign Application Priority Data

Jun. 24, 2005 (JP) .............. 2005-185429
Jun. 24, 2005 (JP) .............. 2005-185445

(51) Int. Cl.
*G06K 9/36* (2006.01)

(52) U.S. Cl. .................... 382/237

(58) Field of Classification Search ........... 382/232, 382/237, 252, 254, 270–274; 358/1.9, 3.03, 358/3.09, 534–536; 341/97
See application file for complete search history.

(56) References Cited

U.S. PATENT DOCUMENTS 5,592,592 A * 1/1997 Shu .............. 358/1.9
5,675,716 A * 10/1997 Shu .............. 358/1.9

FOREIGN PATENT DOCUMENTS

| JP | 06319039 A | 11/1994 |
|---|---|---|
| JP | 08-307680 | 11/1996 |
| JP | 10276328 A | 10/1998 |
| JP | 11017948 A | 1/1999 |
| JP | 11275358 A | 10/1999 |
| JP | 2005039483 A | 2/2005 |

* cited by examiner

*Primary Examiner*—Jose L Couso
(74) *Attorney, Agent, or Firm*—Hogan & Hartson LLP

(57) ABSTRACT

An image processor for converting input multi-grayscale image data, into binary data for each of the pixels has a binary unit. If a grayscale value of the multi-grayscale image data of a target pixel is lower than a reference value less than ½ of a maximum grayscale value, the binary unit converts the input image data into the binary data of a "dot present" or "dot absent" based on a threshold matrix, in which a plurality of threshold values are dispersed without concentrating a plurality of low threshold values, and if the grayscale value of the multi-grayscale image data is higher than the reference value, the binary unit converts the input image data into the binary data of a "dot present", and propagating an error by adding the error to the peripheral pixels based on a first error diffusion matrix.

24 Claims, 19 Drawing Sheets

FIG.1
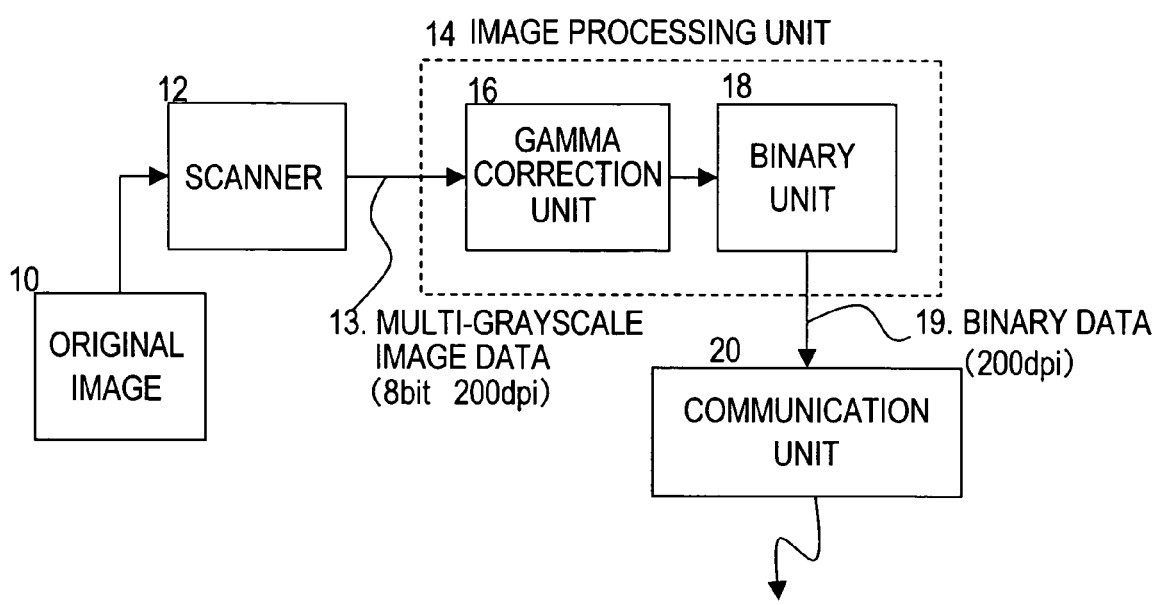
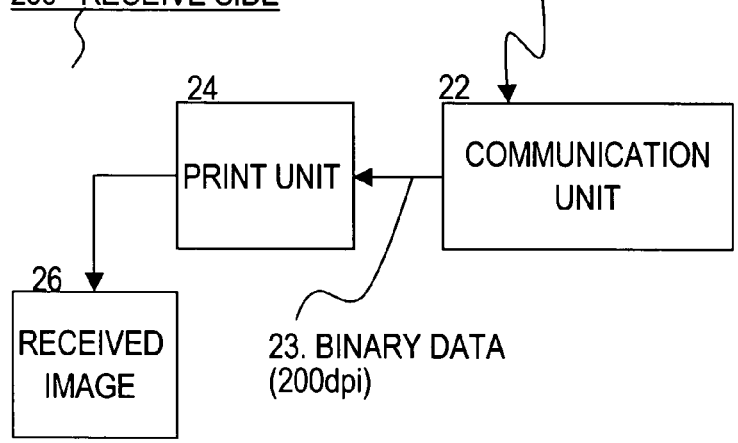

FIG.3

| 0 | 8 | 3 | 11 |
|---|---|---|----|
| 12 | 4 | 15 | 7 |
| 2 | 10 | 1 | 9 |
| 14 | 6 | 13 | 5 |

FIG.4

ETM1

| | | ※ | 7/48 | 5/48 |
|---|---|---|---|---|
| 3/48 | 5/48 | 7/48 | 5/48 | 3/48 |
| 1/48 | 3/48 | 5/48 | 3/48 | 1/48 |

JERVIS – JUDICE – NINKE TYPE ERROR PROPAGATION MATRIX
(※ : TARGET PIXEL)

ETM2

| | | ※ |
|---|---|---|
| 1/16 | 5/16 | 3/16 |

LOW DENSITY ERROR PROPAGATION MATRIX
(※ : TARGET PIXEL)

FIG.7 IMAGE PROCESSING γ TABLE OF BACKGROUND REMOVAL AND BLACK ENHANCEMENT

FIG.9
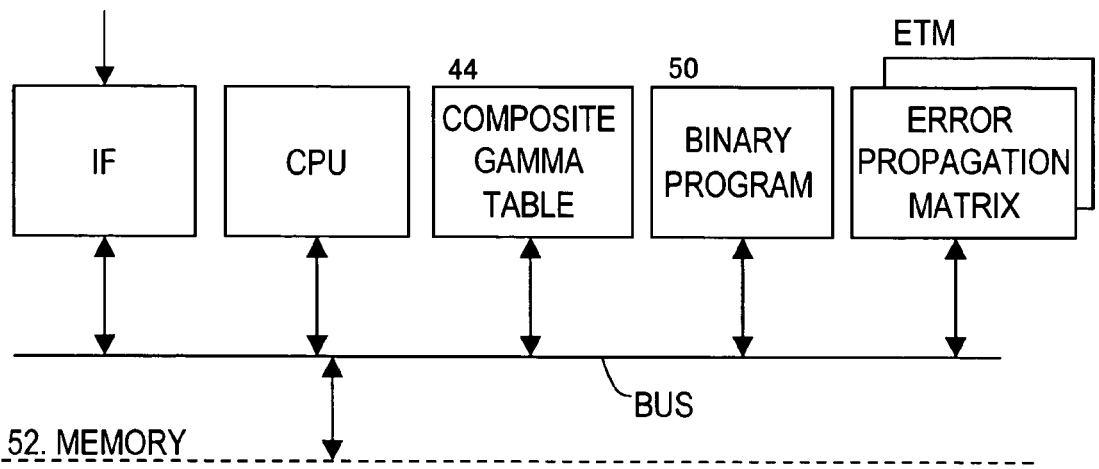
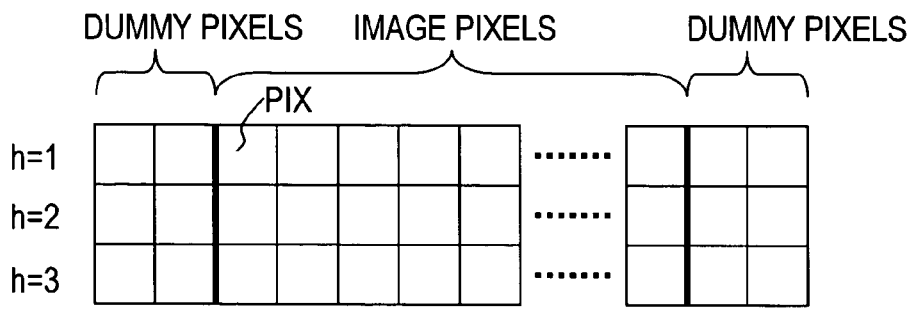

FIG.13
(A) ORIGINAL
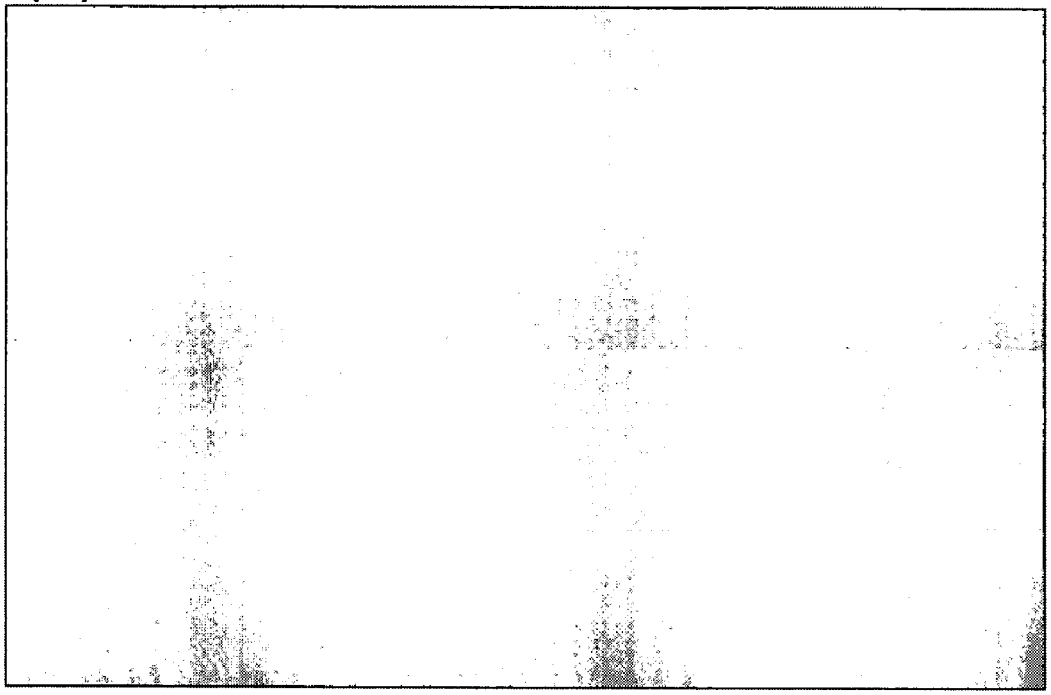
(B) DOT DISPERSED FIXED DITHER
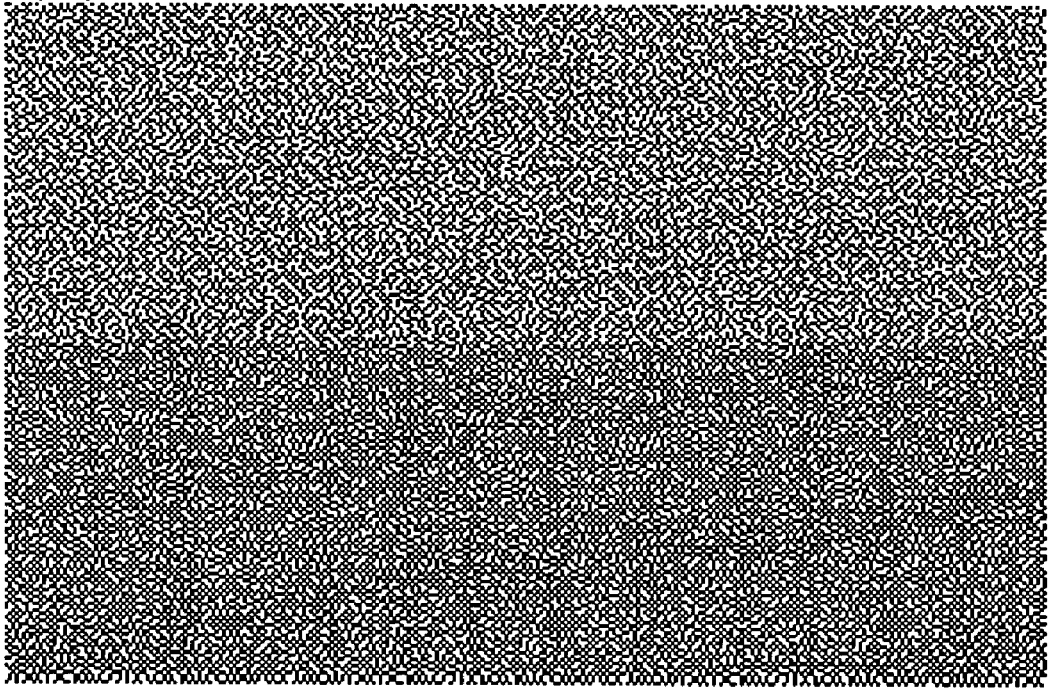

FIG.14
(C) ERROR DIFFUSION
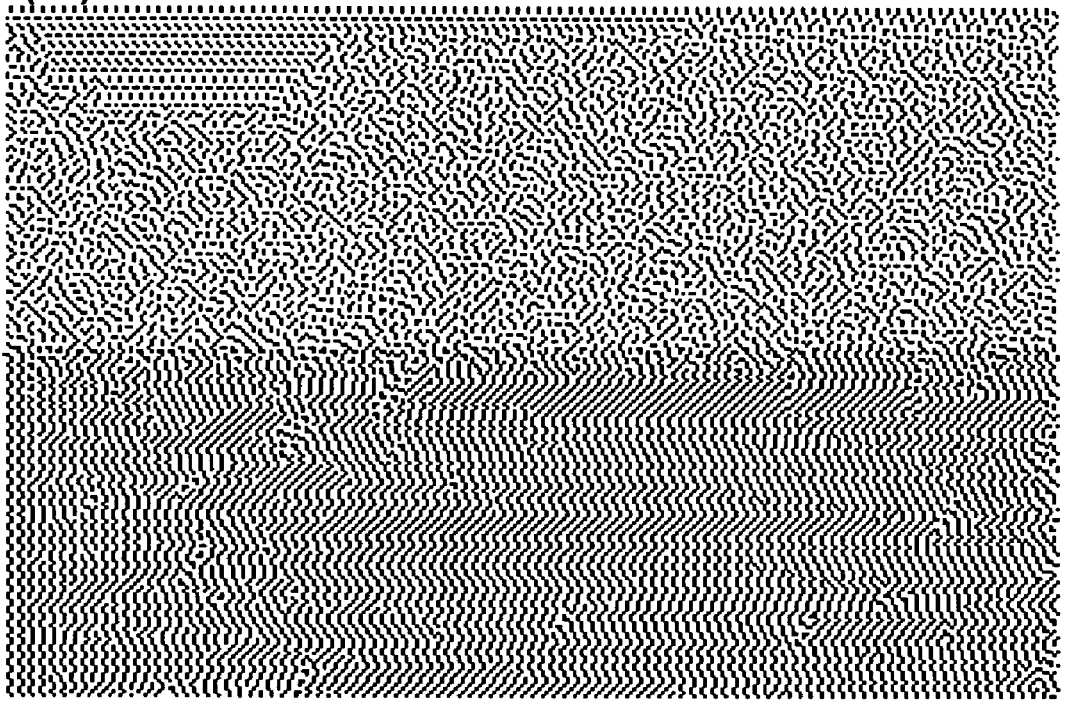
(D) PRESENT EMBODIMENT
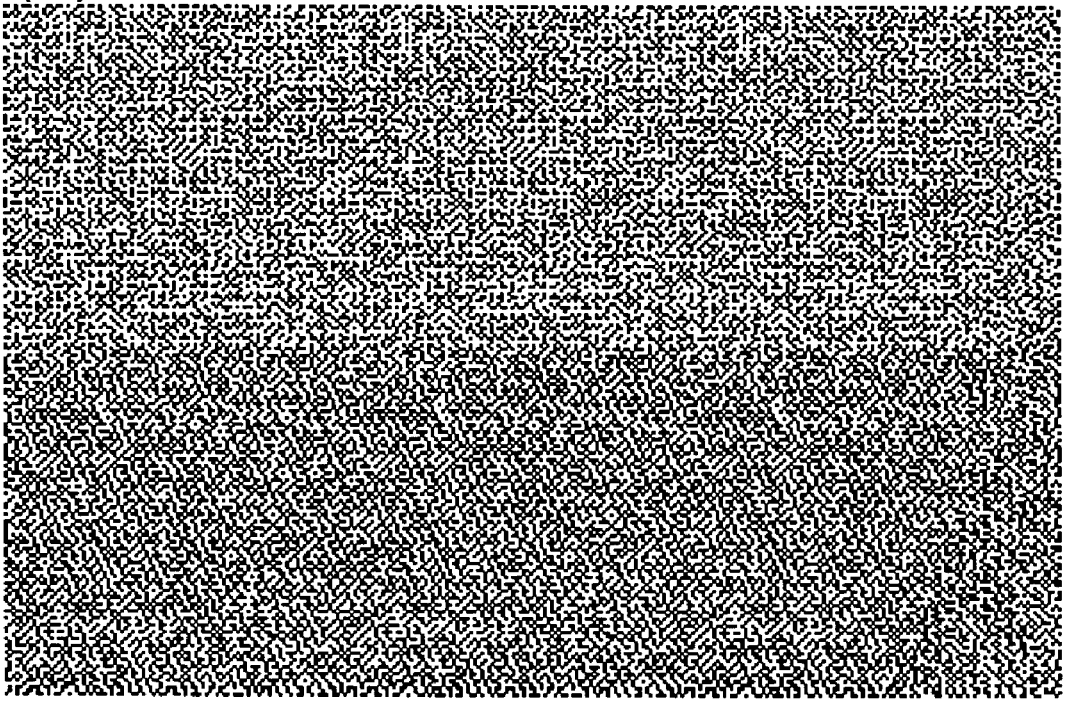

FIG.15
(A) ORIGINAL
(B) DOT DISPERSED DITHER
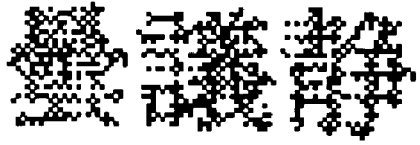
(C) ERROR DIFFUSION
(D) PRESENT EMBODIMENT

FIG.16
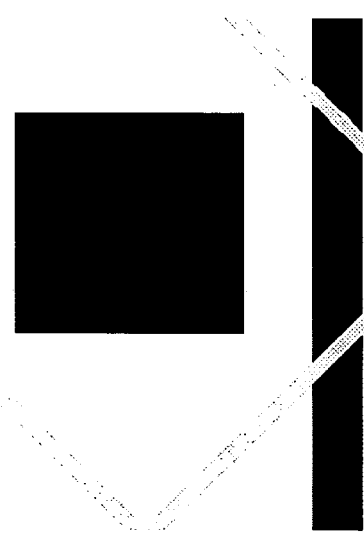
(A) ORIGINAL
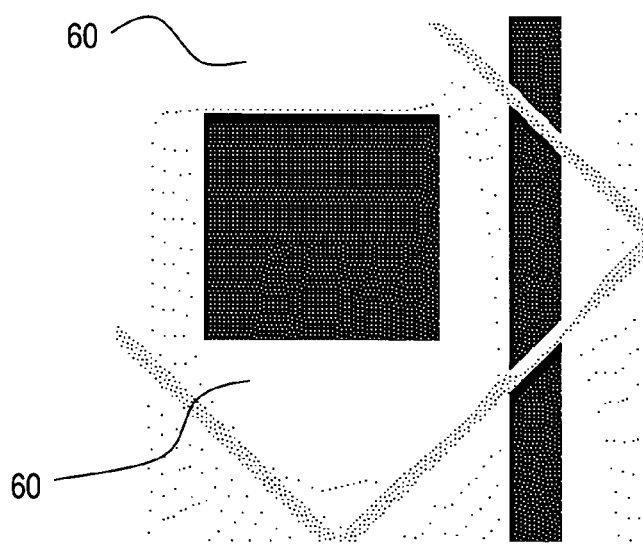
(C) ERROR DIFFUSION
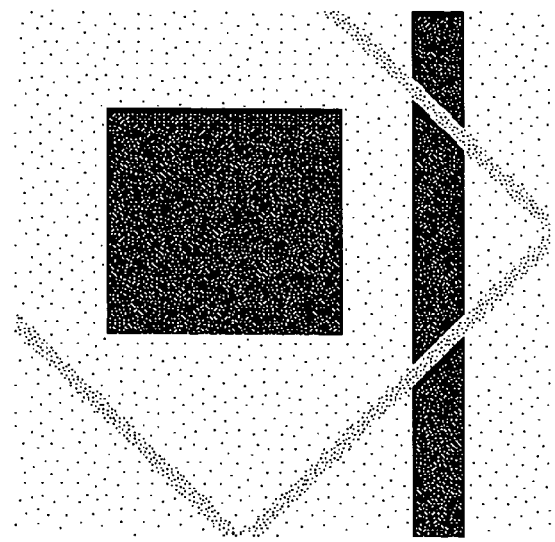
(D) PRESENT EMBODIMENT

FIG.17
(A) ORIGINAL
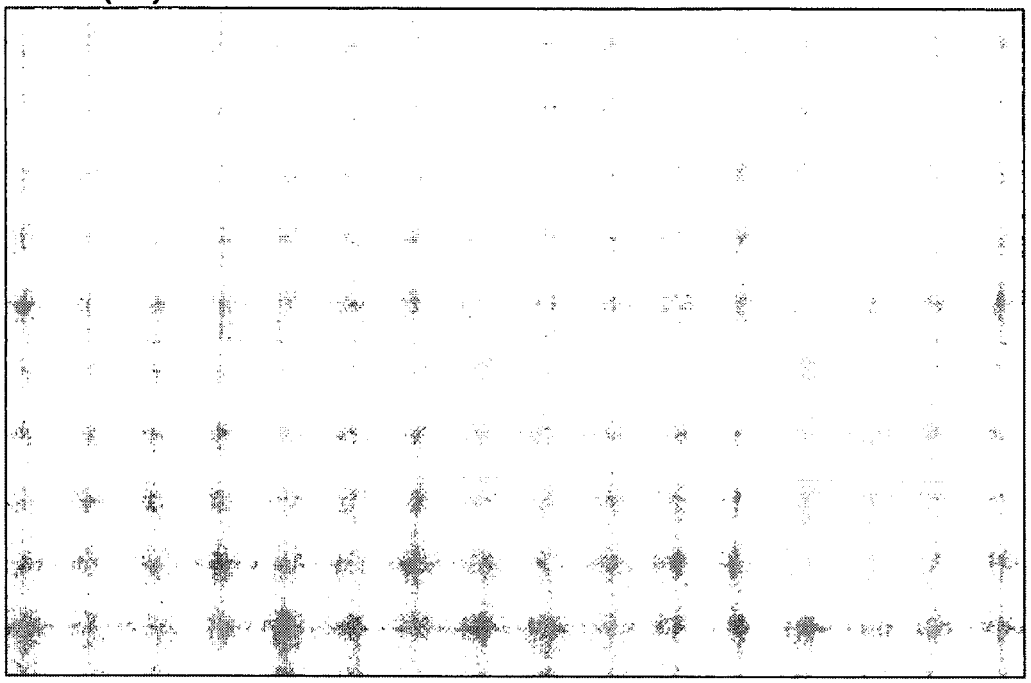
(B) DOT DISPERSED FIXED DITHER
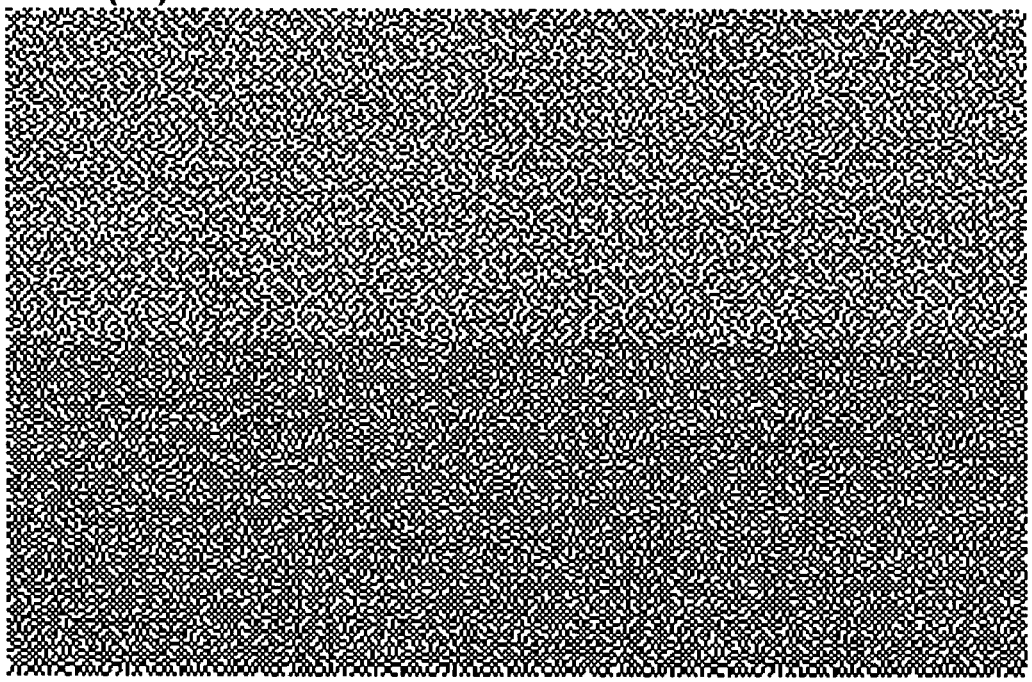

FIG.18
(C) ERROR DIFFUSION
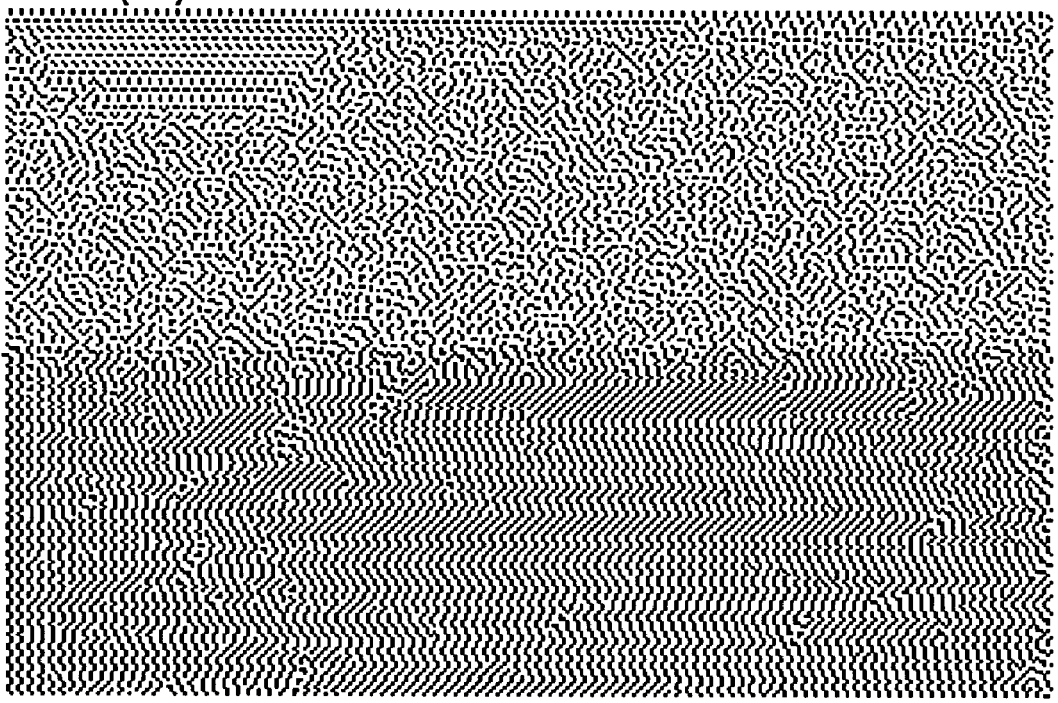
(D) PRESENT EMBODIMENT
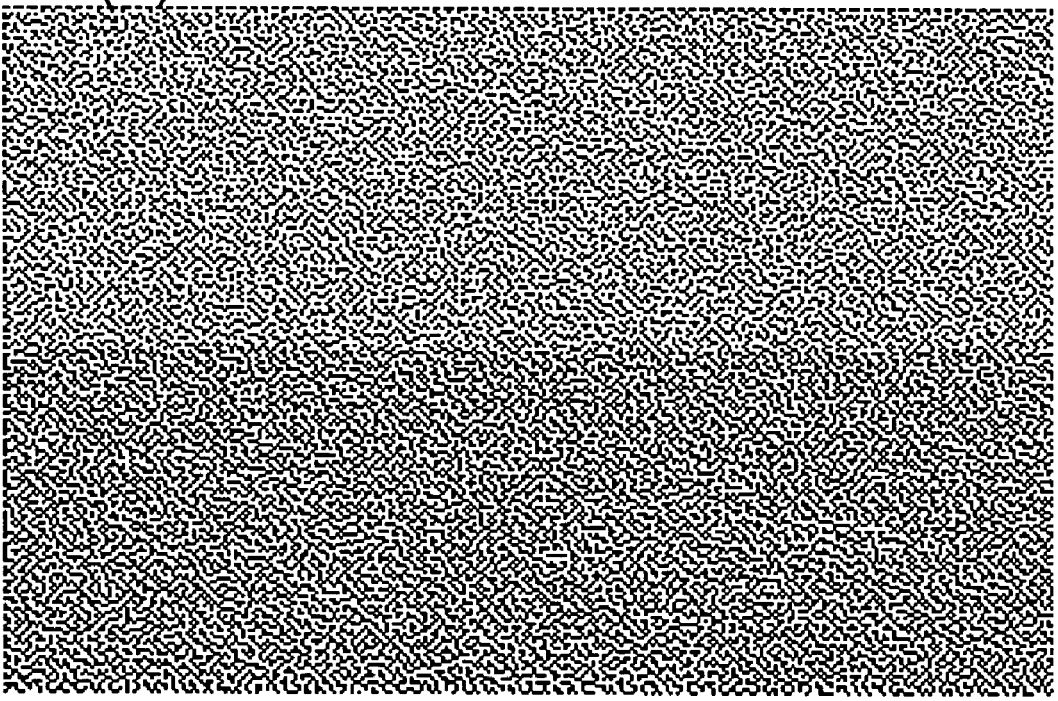

FIG.19
(A) ORIGINAL IMAGE
(B) DOT DISPERSED FIXED DITHER
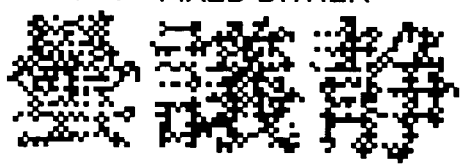
(C) ERROR DIFFUSION
(D) PRESENT EMBODIMENT

FIG.20
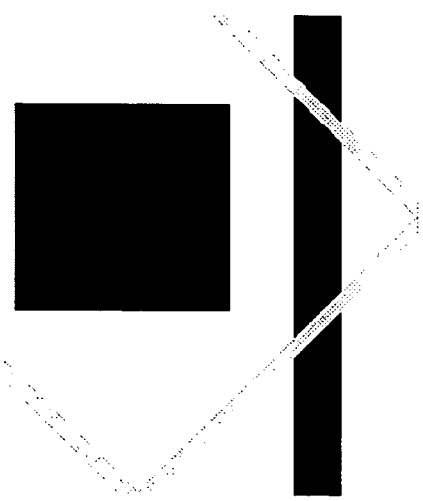
(A) ORIGINAL
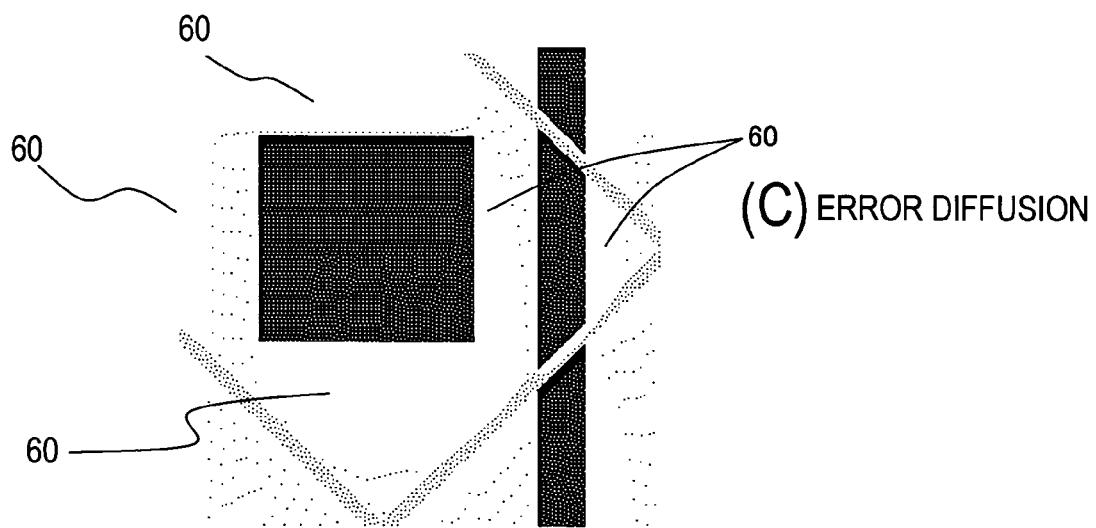
(C) ERROR DIFFUSION
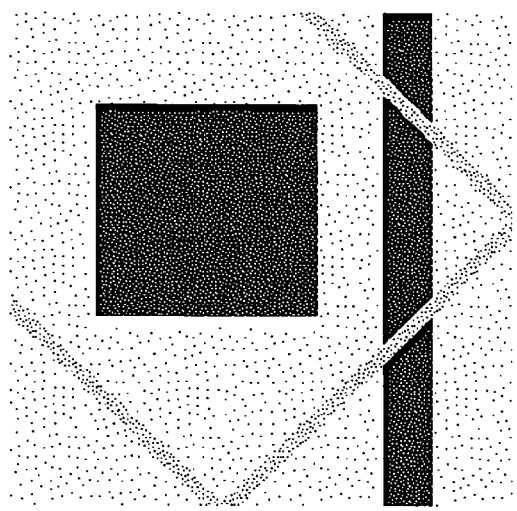
(D) PRESENT EMBODIMENT

IMAGE PROCESSOR AND IMAGE PROCESSING PROGRAM FOR BINARY PROCESSING

CROSS-REFERENCE TO RELATED APPLICATIONS

This application is based upon and claims the benefit of priority from the prior Japanese Patent Application No. 2005-185445, filed on Jun. 24, 2005, and the prior Japanese Patent Application No. 2005-185429, filed on Jun. 24, 2005, the entire contents of which are incorporated herein by reference.

BACKGROUND OF THE INVENTION

1. Field of the Invention

The present invention relates to an image processor and image processing program for binary processing (half tone processing) for converting multi-grayscale image data into binary data that allows half tone display, and more particularly to an image processor and image processing program that can convert low resolution image data into high image quality binary data.

2. Description of the Related Art

Facsimiles and copiers acquire multi-grayscale image data by reading images formed on such print medium as paper by a scanner unit, and converting this into binary data, which allows half tone display. A facsimile sends binary data via a communication line. A copier regenerates the image from the binary data by a print unit. Other than facsimile and copiers, a personal computer system also reads images of a print medium using a scanner function, converts the read multi-grayscale image data into binary data, and regenerates and displays the image on a display device, for example.

Particularly in the case of a facsimile, the generation of binary data with about a 200 dpi low resolution is demanded by standards, and a scanner unit hereof outputs multi-grayscale image data with about a 200 dpi low resolution accordingly. Therefore when the low resolution multi-grayscale image data acquired by a scanner unit is converted into binary data, it is necessary to maintain the gradation of a photo while improving the visibility of fine lines and characters.

Generally a fixed dither method, using a fixed threshold matrix, and an error diffusion method, are used for the binary processing of multi-grayscale image data. There are two types of fixed dither method: a dot concentrated type fixed dither method, where the low threshold values of the threshold matrix are arranged at the center part so that half tone dots or lines grow as the input grayscale increases, and a dot dispersed type fixed dither method, where the threshold values of the threshold matrix are dispersed. The dot concentrated type is called an AM (Amplitude Modulation) screen, since a half tone is expressed by the sizes of the half tone dots where dots are concentrated, and a dot dispersed type is called an FM (Frequency Modulation) screen, since an image is reproduced by the closeness in the spaces of isolated dots.

In the case of the dot concentrated fixed dither method, resolution decreases if the number of screen lines is decreased to improve the graduation, and gradation drops if the number of screen lines is increased to improve resolution, so when the low resolution image data is binarized, it is difficult to maintain the gradation of a photo while improving the visibility of fine lines and characters.

In the case of the dot dispersed type fixed dither method used for ink jet printers, for example, a half tone is expressed by the density of dispersed dots, so gradation improves, but in the case of low resolution image data, the missing of dots stands out, and the visibility of characters and fine lines cannot be assured.

The error diffusion method, on the other hand, is a processing of repeating binarization while propagating or diffusing errors between input image data generated by binarization and original data into peripheral pixels, and is known as a binary processing that can implement both gradation and resolution. Such an error diffusion method is disclosed, for example, in Japanese Patent Application Laid-Open No. H8-307680.

SUMMARY OF THE INVENTION

In the case of the error diffusion method, however, errors generated by binarization are propagated or diffused into peripheral pixels, so a dot generation delay, where dot generation delays in a low density area, and the generation of texture, unique to the error diffusion method in an intermediate density area, occurs, which drops image quality. In the case of the error diffusion method, errors are propagated into peripheral pixels using a fixed error diffusion matrix, regularity is generated in dot generation in an intermediate density area, and texture called "worm noise" tends to be generated. Therefore the error diffusion method excels in the resolution of characters and fine lines, but has problems in the delay of dot generation in a low density area and texture generation in an intermediate density area.

With the foregoing in view, it is an object of the present invention to provide an image processor and image processing program that can binarize original data into binary data with high image quality by suppressing the delay of dot generation and texture generation in an intermediate density area, which occurs to the error diffusion method.

It is another object of the present invention to provide an image processor and image processing program that can binarize multi-grayscale image data with low resolution into binary data with high image quality.

To achieve the above object, a first aspect of the present invention is an image processor for converting input image data, that has multi-grayscale image data for each pixel with a predetermined resolution, into binary data for each of the pixels, having a binary unit, wherein if a grayscale value of the multi-grayscale image data of a processing target pixel is lower than a reference value, which is less than ½ of a maximum grayscale value of the multi-grayscale image data, the binary unit performs a first binary processing for converting the input image data of the processing target pixel into the binary data of a "dot present" or "dot absent" based on a threshold matrix, in which a plurality of threshold values are dispersed without concentrating a plurality of low threshold values, and if the grayscale value of the multi-grayscale image data of the processing target pixel is higher than the reference value, the binary unit performs a second binary processing for converting the input image data of the processing target pixel into the binary data of a "dot present", and an error diffusion processing for adding an error between the input grayscale value of the processing target pixel and the maximum grayscale value to the multi-grayscale image data of peripheral pixels based on a first error diffusion matrix.

According to the first aspect, if the grayscale value is lower than the reference value, the data is binarized by the dot dispersed type fixed dither method, so the delay of dot regeneration in a low grayscale density area, which is unique to the error diffusion method, does not occur, and the generation of texture in an intermediate grayscale density area can be suppressed. If the grayscale value is higher than the reference value, the data is always converted into binary data "dot present", and binary processing, based on the error diffusion method for propagating or diffusing errors to peripheral pixels, is performed, so even if the input image data has low resolution, a drop in visibility of characters and fine lines due to the missing of dots can be suppressed.

In the first aspect, it is preferable that the binary unit performs an error diffusion processing for adding an error of the processing target pixel, for which the first binary processing is performed, to the multi-grayscale image data of peripheral pixels, along with the first binary processing. According to this aspect, errors due to binarization are propagated or diffused to peripheral pixels also for pixels in a low density area, so the continuity of error diffusion of pixels in a high density area can be maintained, and the unevenness of dots, which is generated in an area where dot density is low, can be suppressed. The visibility of characters and fine lines, and the delay of dot generation in a low density area do not especially depend on this error diffusion processing.

To achieve the above object, a second aspect of the present invention is an image processor for converting input image data, that has multi-grayscale image data for each pixel with a predetermined resolution, into binary data for each of the pixels, having a binary unit, which performs binary processing for converting the input image data of the processing target pixel into binary data of "dot present" or "dot absent" based on a threshold matrix, in which a plurality of threshold values are arranged, and an error diffusion processing for adding an error between the input grayscale value of the "dot present" pixel and the maximum grayscale value to the multi-grayscale image data of peripheral pixels based on a first error diffusion matrix, and adding an error between the input grayscale value of the pixel of "dot absent" and the minimum grayscale value to the multi-grayscale image data of peripheral pixels based on a second error diffusion matrix which is different from the first error diffusion matrix.

According to the second aspect, the multi-grayscale image data is binarized based on a corresponding threshold of the threshold matrix, and an error due to the binary processing of each pixel is propagated or diffused to peripheral pixels using a different error diffusion matrix depending on "dot present" or "dot absent", so the generation of texture in the image regenerated by binary data can be suppressed. In other words, by propagating a minus error in the case of "dot present", and a plus error in the case of "dot absent" to peripheral pixels using different error diffusion matrices, the influence of error diffusion is canceled for each other, and the generation of texture, unique to the error diffusion method, can be suppressed.

In the second aspect, it is preferable that for the first error diffusion matrix, the error is propagated or diffused to peripheral pixels positioned in a first direction from the processing target pixel with a higher weight, and for the second error diffusion matrix, the error is propagated or diffused to peripheral pixels in a second direction, which is different from the first direction from the processing target pixel with a higher weight. According to this aspect, the propagations directions of the plus error and the minus error are different, so the influence of error diffusion is canceled for each other, and the generation of texture, unique to the error diffusion method, can be suppressed.

In the second aspect, it is preferable that for the first error diffusion matrix, all the errors are propagated or diffused to peripheral pixels, and for the second error diffusion matrix, a part of the errors is propagated or diffused to peripheral pixels. According to this aspect, all the minus errors are propagated or diffused to peripheral pixels, and a part of the plus errors is propagated or diffused to peripheral pixels, so the influence of error diffusion is canceled for each other, and the generation of texture, unique to the error diffusion method, can be suppressed.

In the second aspect, it is preferable that if a grayscale value of the multi-grayscale image data of a processing target pixel is lower than a reference value, which is less than ½ of a maximum grayscale value of the multi-grayscale image data, the binary unit performs binary processing based on the threshold matrix, and if a grayscale value of the multi-grayscale image data of a processing target pixel is higher than the reference value, the binary unit converts the input image data of the processing target pixel into the binary data "dot present", and adds the error to the multi-grayscale image data of the peripheral pixels based on the first error diffusion matrix.

According to the above preferred aspect, if the grayscale value of the multi-grayscale image data of the processing target pixel is higher than the reference value, the target pixel is always sorted to "dot present", the characters and fine lines can be binarized to "dot present" without fail, and if the grayscale value of the multi-grayscale image data of the processing target pixel is lower than the reference value, the pixel is binarized based on the threshold of the threshold matrix, so the delay of dot generation in a low density area can be prevented.

In the second aspect of the present invention, it is also preferable that in the threshold matrix, a plurality of threshold values are dispersed without concentrating a plurality of low threshold values. According to this aspect, binary processing is performed based on the dispersed threshold matrix, so the aggravation of visibility by the missing of dots in characters and fine lines can be suppressed.

To achieve the above object, a third aspect of the present invention is an image processor for converting input image data, that has multi-grayscale image data for each pixel with a predetermined resolution, into binary data for each of the pixels, having a binary unit wherein if a grayscale value of the multi-grayscale image data of a processing target pixel is lower than a reference value, which is less than ½ of a maximum grayscale value of the multi-grayscale image data, the binary unit performs binary processing for converting the input image data of the processing target pixel into the binary data of "dot present" or "dot absent" based on the threshold matrix, in which a plurality of threshold values are dispersed without concentrating a plurality of low threshold values, and the binary unit performs an error diffusion processing for adding an error of the processing target pixel generated by the binary processing to the multi-grayscale image data of peripheral pixels.

According to the third aspect of the present invention, if the grayscale value of the multi-grayscale image data of the processing target pixel is lower than a reference value, the binary unit of the image processor performs binary processing according to the dot dispersed fixed dither method, so a drop in visibility by the missing of dots in characters and fine lines is suppressed, and the generation of texture can be suppressed by propagating an error to peripheral pixels.

In the third aspect of the present invention, it is preferable that in the error diffusion processing, the binary unit adds the error of the pixel of "dot present" to the multi-grayscale image data of peripheral pixels based on a first error diffusion matrix, and adds the error of the pixel with "dot absent" to the multi-grayscale image data of peripheral pixels based on a second error diffusion matrix, which is different from the first error diffusion matrix.

According to the above aspect, a minus error is propagated by the first error diffusion matrix, and a plus error is propagated or diffused by the second error diffusion matrix in the error diffusion processing, so the influence of error diffusion can cancel each other, and the generation of texture can be suppressed.

BRIEF DESCRIPTION OF THE DRAWINGS

FIG. 1 is a block diagram depicting a facsimile device having an image processing unit according to the present embodiment;

FIG. 3 shows an example of a threshold matrix in a dot dispersed type fixed dither method;

FIG. 4 shows an example of a first and second error diffusion matrixes;

FIG. 9 is a block diagram depicting an image processing unit according to the present embodiment;

FIG. 13 shows an original image (A) and the binary processing result of the dot dispersed fixed dither (B) performed on a patch image in an intermediate density area;

FIG. 14 shows the binary processing result of the error diffusion (C) and hybrid error diffusion (D) performed on a patch image in an intermediate density area;

FIG. 15 shows an original image (A) and binary processing result of the dot dispersed fixed dither (B), error diffusion (C) and hybrid error diffusion (D) performed on characters;

FIG. 16 shows an original image (A) and binary processing result of error diffusion (C) and hybrid error diffusion (D) performed on a patch pattern having a low density area;

FIG. 17 shows an original image (A) and the binary processing result of a dot dispersed fixed dither (B) performed on a patch image in an intermediate density area;

FIG. 18 shows the binary processing result of the error diffusion (C) and hybrid error diffusion (D) performed on a patch image in an intermediate density area;

FIG. 19 shows an original image (A) and the binary processing result of a dot dispersed fixed dither (B), error diffusion (C) and hybrid error diffusion (D) performed on characters; and FIG. 20 shows an original image (A) and the binary processing result of error diffusion (C) and hybrid error diffusion (D) performed on a patch pattern having a low density area.

DESCRIPTION OF THE PREFERRED EMBODIMENTS

Figure 2:
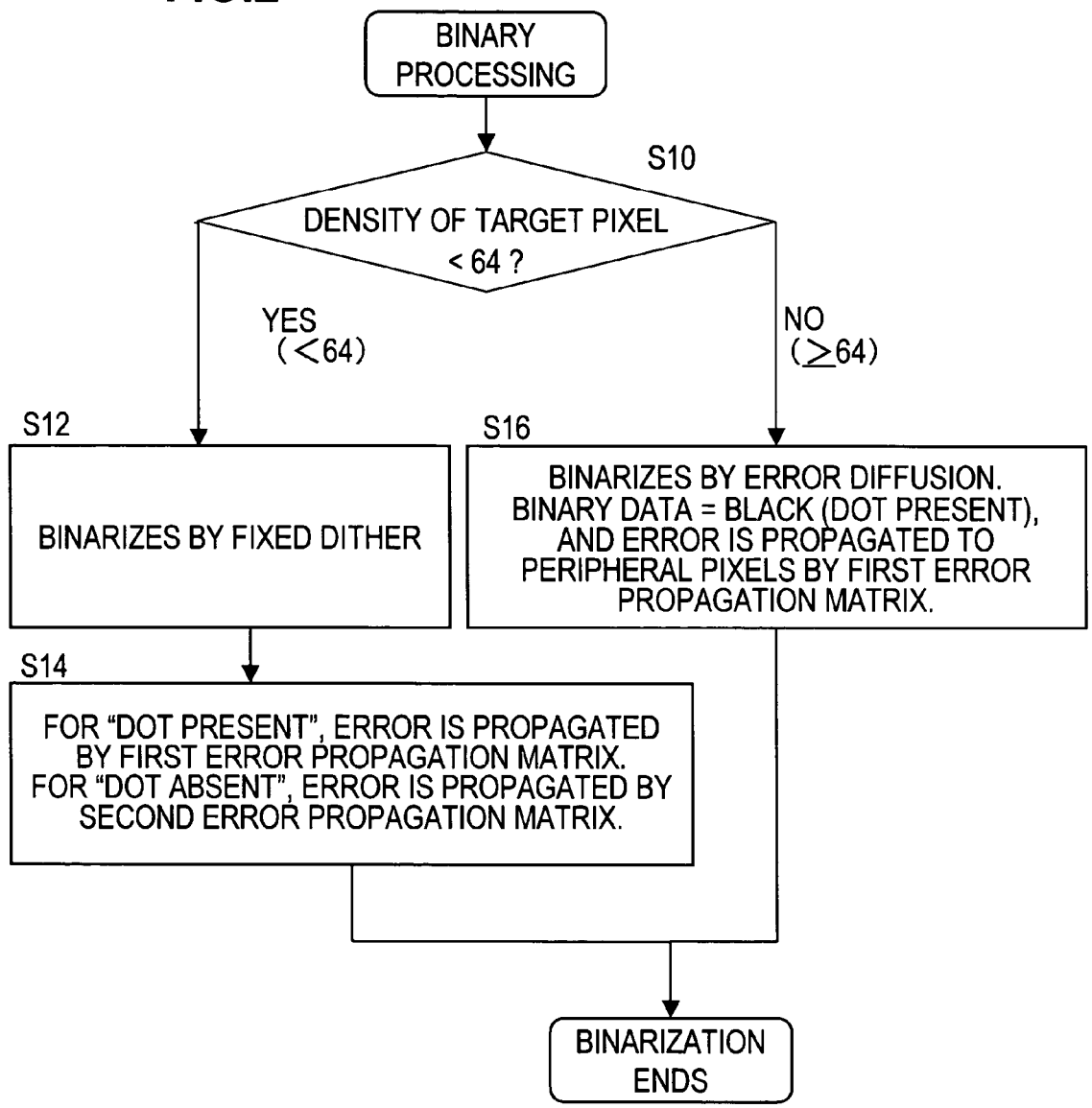
FIG. 2 is a flow chart depicting binary processing of a binary unit according to the present embodiment.

Embodiments of the present invention will now be described. The technical scope of the present invention, however, is not limited to the embodiments, but covers the issues disclosed in the Claims and equivalents thereof.

In the following embodiments, the image processing of a facsimile will be described as an example of binarizing low resolution images. However the present embodiment can be applied to cases of binarizing low resolution images other than those of a facsimile.

FIG. 1 is a block diagram depicting a facsimile device having an image processing unit according to the present embodiment. In FIG. 1, a configuration at a transmission side 100 and a configuration at a receive side 200 are shown. The transmission side 100 is comprised of a scanner 12 which scans an original image 10 and generates multi-grayscale image data 13 for each pixel, an image processing unit 14 for performing image processing on the multi-grayscale image data 13 generated by the scanner 12 and generating binary data (data on "dot present" and "dot absent") 19 for each pixel, and a transmission unit 20 for sending the binary data 19. The multi-grayscale image data 13 is data which allows 8-bit and 256 grayscales of grayscale representation for pixels of low resolution, such as 200 dpi, images. In the case of a facsimile device, the resolution of transmission data is standardized as 200 dpi, so the scanner 12 generally has similar resolution. This is because even if multi-grayscale image data is generated with higher resolution, increasing the resolution of the scanner becomes meaningless if the resolution of the binary data is lower than this.

The image processing unit 14 in the present embodiment is comprised of a gamma correction unit 16 for correcting multi-grayscale data 13 generated by a scanner 12, and a binary unit 18 for binarizing the corrected multi-grayscale image data. The image processing unit 14 may be comprised of a gamma correction unit and a binary unit 18 which are dedicated hardware respectively, or an internal CPU unit of the image processing unit 14 may perform gamma correction processing and binary processing by executing a gamma correction program and a binary program.

The receive side 200 is comprised of a communication unit 22 for receiving transmitted binary data, and a print unit 24 for regenerating images by setting "dot present" or "dot absent" for each pixel according to the received binary data 23. Received image 26 is formed by the print unit 24 regenerating the image based on the binary data.

[Binary Processing According to Hybrid Error Diffusion]

By using the error diffusion method and dot dispersed fixed dither method together, the binary processing according to the present embodiment suppresses the delay of dot generation in a low density area, and suppresses the generation of texture (worm noise) in an intermediate density area, while maintaining the high resolution of characters and fine lines by the error diffusion method. And an error of binarized pixels is added to the grayscale values of peripheral pixels to perform error diffusion processing.

FIG. 2 is a flow chart depicting the binary processing of the binary unit according to the present embodiment. According to this binary processing, depending on whether the grayscale value (density) of a target pixel to which an error propagated from a processed pixel is added is lower than a reference value, which is a value smaller than half of the maximum grayscale value 255, such as 64 (in low density area), or greater than the reference value (in high density area), either the binary processing according to the fixed dither method or the error diffusion processing, which diffuses an error always regarding it as "dot present", is performed. In other words, if the density of the current processing target pixel is lower than the reference value (64) (YES in S10), binary processing, based on the fixed dither method, is performed (S12). For the binary processing based on the fixed dither method, the dot dispersed fixed dither method is preferred to the dot concentrated fixed dither method, for example. And after the binary processing by the fixed dither method is performed, an error generated by this binary processing is added (propagated) to the grayscale value of the multi-grayscale image data of peripheral pixels by the later mentioned error diffusion matrix.

If the density of the processing target pixel is higher than the reference value (NO in S10), binary processing based on the error diffusion method, of which threshold is the reference value, is performed (S16). In other words, the processing target pixel is converted into binary data "dot present", and the error generated at this time is added (propagated) to the grayscale value of the multi-grayscale image data of peripheral pixels based on a first error diffusion matrix. In other words, the binary processing, S16, based on this error diffusion method, is the same as the error diffusion method of which threshold is the reference value.

FIG. 3 shows an example of a threshold matrix of the dot dispersed fixed dither method. In this example, the grayscale values of the multi-grayscale image data are 0 to 15, and the thresholds (0 to 15) are dispersed and arranged in a 4×4 pixel matrix respectively as the threshold matrix. If the grayscale values of the multi-grayscale image data are 0 to 255, discrete values according to the size of the threshold matrix are dispersed and arranged. In the case of the 4×4 matrix example in FIG. 3, for example, the thresholds 0 to 15 become discrete threshold values normalized to 0 to 255 with an interval of 17. In this way, by performing binary processing by the dot dispersed fixed dither method when the density of a target pixel is in a low density area, visibility can be increased by decreasing the missing of dots of characters and fine lines even if the image data has low resolution.

In the case of performing binary processing based on the fixed dither method, if the current processing target pixel is converted into binary data "dot present", the error generated by this is added (propagated) to the grayscale value of the multi-grayscale image data of peripheral pixels using a first error diffusion matrix. If the processing target pixel is converted into binary data "dot absent", the error generated by this is propagated using a second error diffusion matrix, which is different from the first error diffusion matrix (S14). In other words, in the case when the grayscale value of the multi-grayscale image data of the processing target pixel is more than the threshold of the threshold matrix (thresholds are 0 to 255) shown in FIG. 3, if the processing target pixel is converted into binary data "dot present" (grayscale value=255), the minus error, which is the difference between the input grayscale value of the processing target pixel and the grayscale value of "dot present" (maximum grayscale value 255), is propagated to peripheral pixels according to a first error diffusion matrix, which is the same as the error diffusion matrix used for the error diffusion of high density pixels. In the case when the grayscale value of the multi-grayscale image data of the processing target pixel is smaller than the threshold of the threshold matrix, on the other hand, if the processing target pixel is converted into the binary data "dot absent" (grayscale value=0), the plus error, which is the difference between the input grayscale value of the processing target pixel and the grayscale value of "dot absent" (minimum grayscale value 0) is propagated to peripheral pixels according to a second error diffusion matrix of which error diffusion direction is different from the first error diffusion matrix and of which the amount of error to be propagated is also different from a first error diffusion matrix.

FIG. 4 shows an example of the first and second error diffusion matrices. The first threshold propagation matrix ETM1 shows the ratio of the error amount which is generated by binary processing in a current processing target pixel (* in FIG. 4) (difference between the input grayscale value of the target pixel and grayscale value after binary processing (0 or 255)), and which will be propagated to peripheral pixels. The example in FIG. 4 is the Jarvis-Judice-Ninke type error diffusion matrix, and shows the ratio of the error which will be propagated to peripheral pixels in three rows, 5 columns, as this ratio 7/48 is allocated to pixels at the right and below, 5/48 to the second pixel to the right, lower right and lower left pixels, 3/48 to the second lower right and second lower left pixels, and 1/48 to the third lower right and third lower left pixels. Therefore the first error diffusion matrix ETM1 is characterized in that all the errors are propagated to peripheral pixels, and the propagation direction is slightly the lower right direction from the target pixel.

In the case of the second error diffusion matrix ETM2, on the other hand, a part of the errors generated in binary processing of the target pixel are propagated to peripheral pixels. In other words, the error diffusion matrix is a two row and three column matrix size, which is smaller than the first error diffusion matrix ETM1, and for the ratios, 5/16 is allocated to the lower left pixel of the target pixel, 3/16 to the bottom pixel, and 1/16 to the second lower left pixel. Therefore the second error diffusion matrix ETM2 propagates a part of the errors, 9/16, to the peripheral three pixels in the position shown in FIG. 4. This propagation direction is in the slightly lower left direction, which is different from the slightly lower right direction of the first error diffusion matrix.

The point of the binary processing according to the present embodiment is as follows. If the density of the current processing target pixel is an intermediate or low density (grayscale value is less than 64), a grayscale value higher than the threshold of the threshold matrix is binarized into "dot present", and a grayscale value lower than that is binarized into "dot absent" according to the dot dispersed type fixed dither method. By performing this binary processing based on the dot dispersed fixed dither method, the missing of dots in characters and fine lines can be suppressed, and visibility can be improved. And the delay of dot generation in a low density area, a problem unique to the error diffusion method, can also be solved.

In the fixed dither method, error diffusion is not normally performed, but in the present embodiment, for the pixels binarized by the dot dispersed fixed dither method, errors are propagated to peripheral pixels. And for this error diffusion, the minus error of a pixel binarized to "dot present" is propagated to peripheral pixels based on the first error diffusion matrix ETM1, which allocates all errors with a predetermined ratio and propagates them in a slightly lower right direction. The plus error of the pixel binarized to "dot absent", on the other hand, is propagated to peripheral pixels based on the second error diffusion matrix ETM2, which allocates a part of the errors with a predetermined ratio and propagates them in a slightly lower left direction. In other words, firstly, by making the error diffusion directions of minus error and plus error different, the texture (worm noise) caused by an error diffusion in a fixed direction, which is a problem unique to the error diffusion method, can be suppressed. Secondly, the pixels, of which density is lower than a reference value, which is lower than ½ the maximum grayscale value, are binarized by a threshold matrix, so for a minus error, an excess dot status is prevented by propagating all errors, and for a plus error, an insufficient dot status is prevented in a low density area by propagating only a part of the errors.

In the case when the density of a current processing target pixel is an intermediate high density (grayscale is 64 or more), all of the dots are converted into binary data "dot present", and a minus error generated by this is propagated to peripheral pixels based on the first error diffusion matrix ETM1. In other words, this is a binary processing based on the error diffusion method of which the reference value is 64. By this, the generation of texture (worm noise) in an intermediate density area, which is a problem unique to the diffusion method of which threshold is ½ of the maximum grayscale value, can be suppressed. In other words, even if the density of a pixel is lower than ½ of the maximum grayscale value, the pixel is binarized to "dot present" if the density is 64 or more, so the generation of texture is suppressed. By propagating all the errors according to the first error diffusion matrix, appropriate half tones for an intermediate density area can be expressed by the binary data. Also by setting the reference value relatively low, such as 64, the generation of dots becomes easier for characters and fine lines, and visibility can be improved.

For a pixel of which density is in a low density area, that is for a pixel of which grayscale value is 64 or less and which was binarized to "dot present" by the fixed dither method, an error is propagated to peripheral pixels using the first error diffusion matrix used for the error diffusion method for an intermediate or high density area, so the continuity of error diffusion from an intermediate density to a high density area can be maintained, and the unnaturalness caused by different binary settings is suppressed.

Also for a pixel of which density is in an intermediate and low density area, not the error diffusion method but the fixed dither method is used, so the delay of dot generation in the low density area, a problem unique to the error diffusion method, can be suppressed, and the image quality of half tones in an intermediate or low density area can be improved compared with the case of processing all by the error diffusion method. In other words, even if the density of the pixel is low, a dot is certainly generated if the density is higher than the threshold of the threshold matrix, so the delay of dot generation can be suppressed.

[Gamma Correction]

As FIG. 1 shows, in the image processing unit 14 of the present embodiment, the gamma correction unit 16 performs gamma correction on the multi-grayscale image data 13 to be input, before binary processing by the binary unit 18. Buy this gamma correction, non-linear characteristics, generated in the binary processing by the hybrid error diffusion used in the present embodiment, is corrected. In other words, in the hybrid error diffusion method, a pixel of which density is higher than the reference value is always binarized to "dot present", and the error is propagated, and a pixel of which density is lower than the reference value is binarized by the threshold matrix, and the error is propagated. Therefore, this hybrid error diffusion method includes the non-linear characteristics between the input grayscale value of the multi-grayscale image data before binary processing and the output grayscale value of the binary data. Therefore gamma correction is performed to correct these non-linear characteristics.

Figure 5:
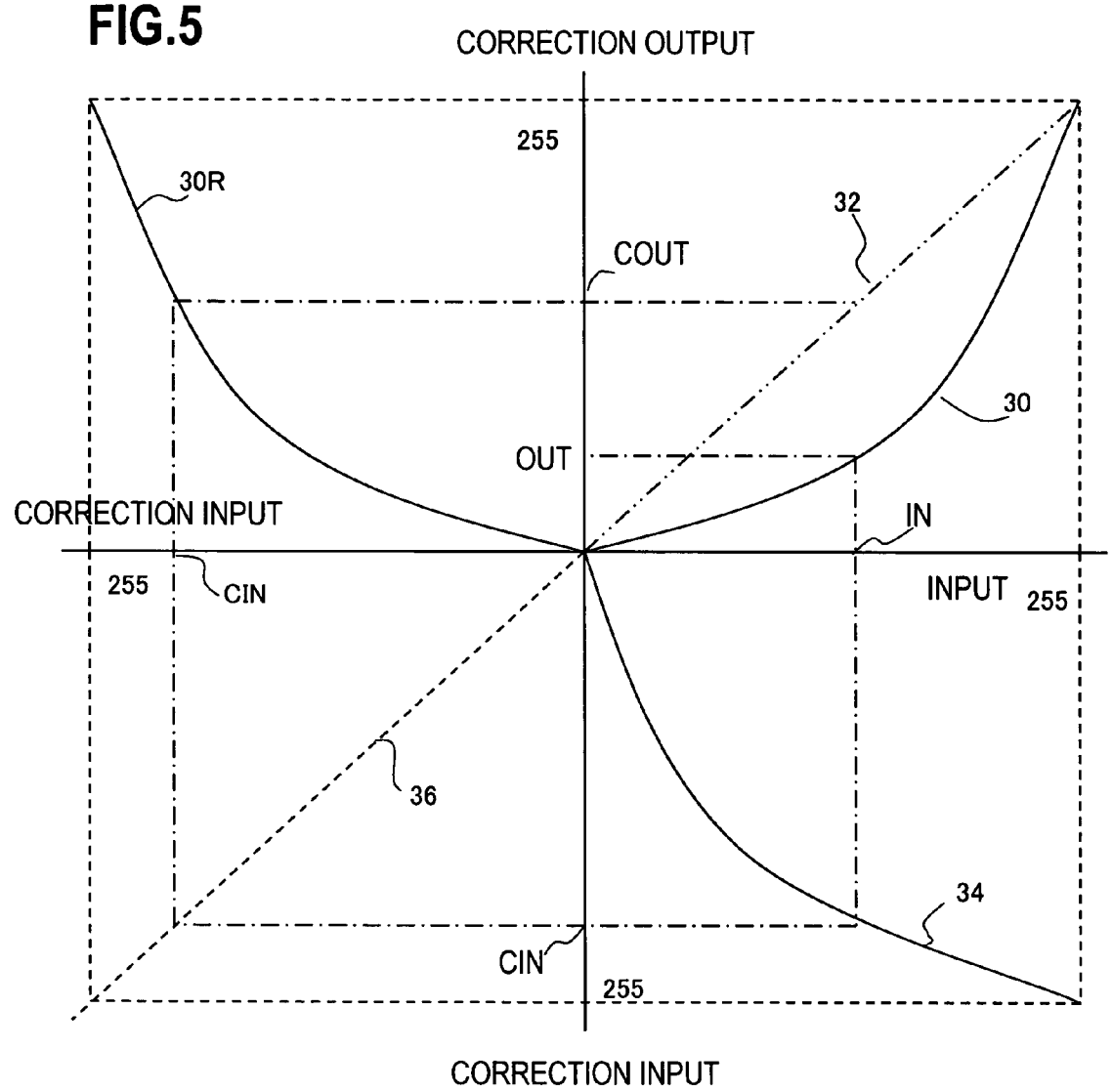
FIG. 5 is a diagram depicting the gamma correction processing according to the present embodiment.

FIG. 5 is a diagram depicting the gamma correction processing according to the present embodiment. The density characteristics curve 30, shown in the first quadrant, is the input/output characteristics of the binary processing by hybrid error diffusion. The input grayscale value of the binary processing and the output grayscale value of the binary data have a non-linear characteristic, which is convex in the downward direction, as the characteristic curve 30 shows. In other words, compared with an ideal linear characteristic 32, the output grayscale OUT after performing binary processing on the input grayscale IN is smaller than the output grayscale COUT binarized according to the ideal linear characteristic 32.

Therefore according to the present embodiment, the input grayscale IN is corrected by the correction gamma table 34 shown in the fourth quadrant, and this corrected input CIN is binarized by the binary unit. This correction gamma table 34 is one-dimensional having a characteristic, which is convex in the upward direction, which is the opposite of the characteristic curve 30, and when the input IN is corrected by this correction gamma table 34, the corrected input CIN becomes a value greater than the input IN.

The third quadrant has a return line 36 for moving the corrected input CIN to the abscissa of the second quadrant. In other words, the corrected input CIN on the ordinate of the third and fourth quadrants and the corrected input CIN on the abscissa of the second quadrant are the same values.

Finally, the characteristic curve 30R, which is symmetrical with the characteristic curve 30, is shown in the second quadrant, and the corrected output COUT after the corrected input CIN is binarized by the characteristic curve 30R matches the output value in the case of binarizing the input IN by the ideal linear characteristic 32.

The gamma table 34 is determined as follows. First patch image data with a predetermined grayscale value is generated as input image data. This patch image data is comprised of a plurality of patch pattern data having grayscale values from white (grayscale value 0) to black solid (grayscale value 255) with a predetermined grayscale interval. This patch image data is converted into binary data by the binary unit 18 based on the hybrid error diffusion method, an image is created based on this binary data, and the patch pattern density of each grayscale of the generated image is measured, and by this, the characteristic curve 30 of the binary unit is detected. This image of the binary data is generated by printing the image on a paper medium using the print unit of a facsimile device. Or the image based on the binary data may be displayed on the display device, and the patch pattern density thereof may be measured. In the case of the a print unit, the characteristic curve 30 includes the characteristics of the print unit. In the case of displaying the image on the display device as well, the characteristic curve 30 includes the characteristics of the display device. For the characteristic curve 30 detected like this, the correction gamma table 34 is determined so that ideal linear characteristics are acquired. This is the density correction gamma table.

Figure 6:
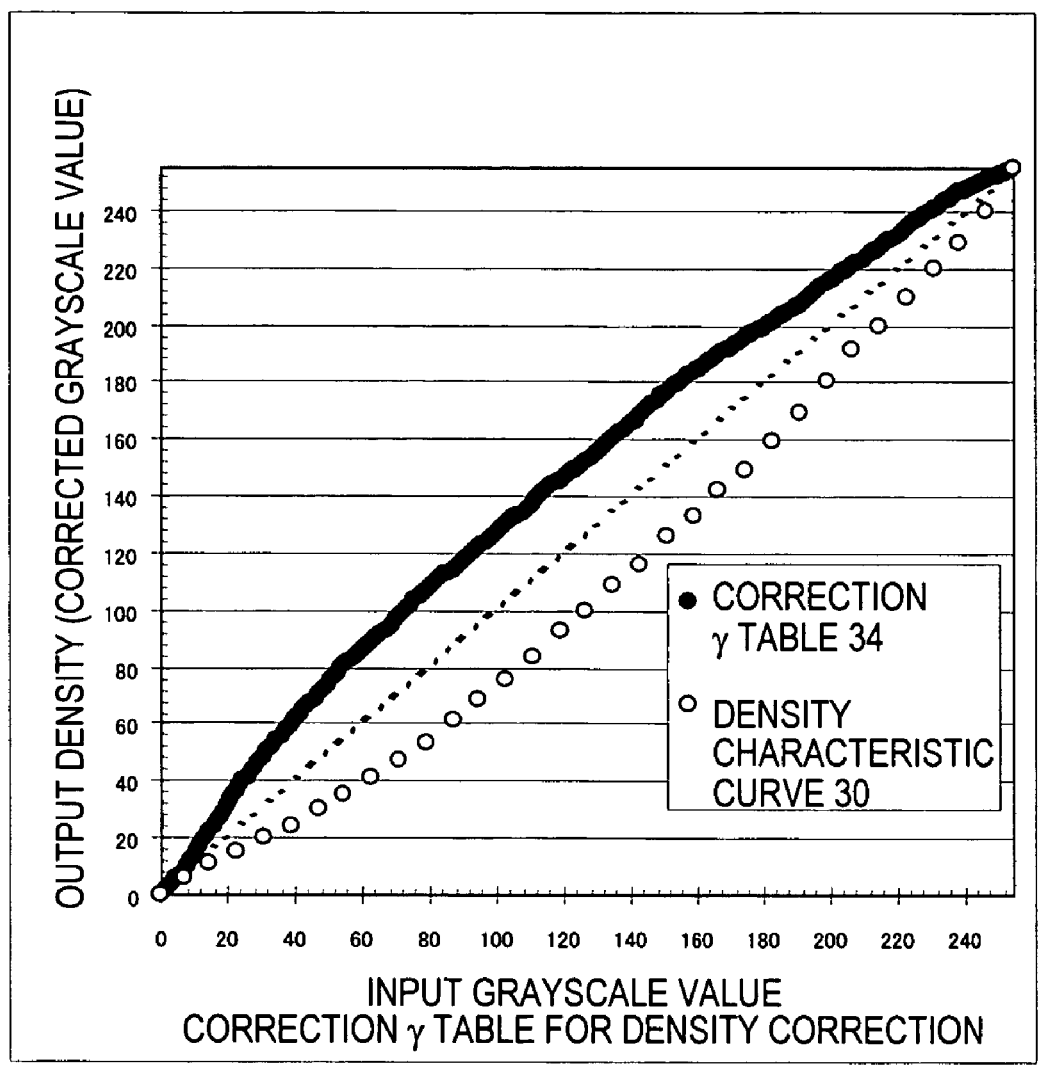
FIG. 6 is a diagram depicting an example of a gamma table for density correction according to the present embodiment.

FIG. 6 is a diagram depicting an example of the density correction gamma table according to the present embodiment. In this example, 8-bit patch image data from white (0) to black (255), with an interval of 33 in grayscale, is generated as the input image data, binary data is generated by the hybrid error diffusion method, the binary data is printed, and the output density of the patch image at each grayscale is measured. These measured values are the output density data with a real number precision based on a 64-bit floating point. From the output density data with a real number precision, the density correction gamma table 34 is determined.

Based on this density correction gamma table 34, the gamma correction unit 16 converts the grayscale value of the input multi-grayscale image data into the corrected input grayscale value. At this time, the corrected input grayscale value has a real number precision in a floating point bit format. Therefore a highly accurate correction is possible. The corrected input grayscale value is binarized by the binary unit 18, so the binary unit 18 processes the multi-grayscale image data of each pixel in 64 bits corresponding the corrected input grayscale value with real number precision. So a considerable processing load is generated in the binary processing. Therefore it is preferable that a 64-bit real number precision is changed to a 16-bit fixed floating point bit type integer precision, and the calculation of an error to be diffused is executed not based on division but on a right bit shift.

Figure 7:
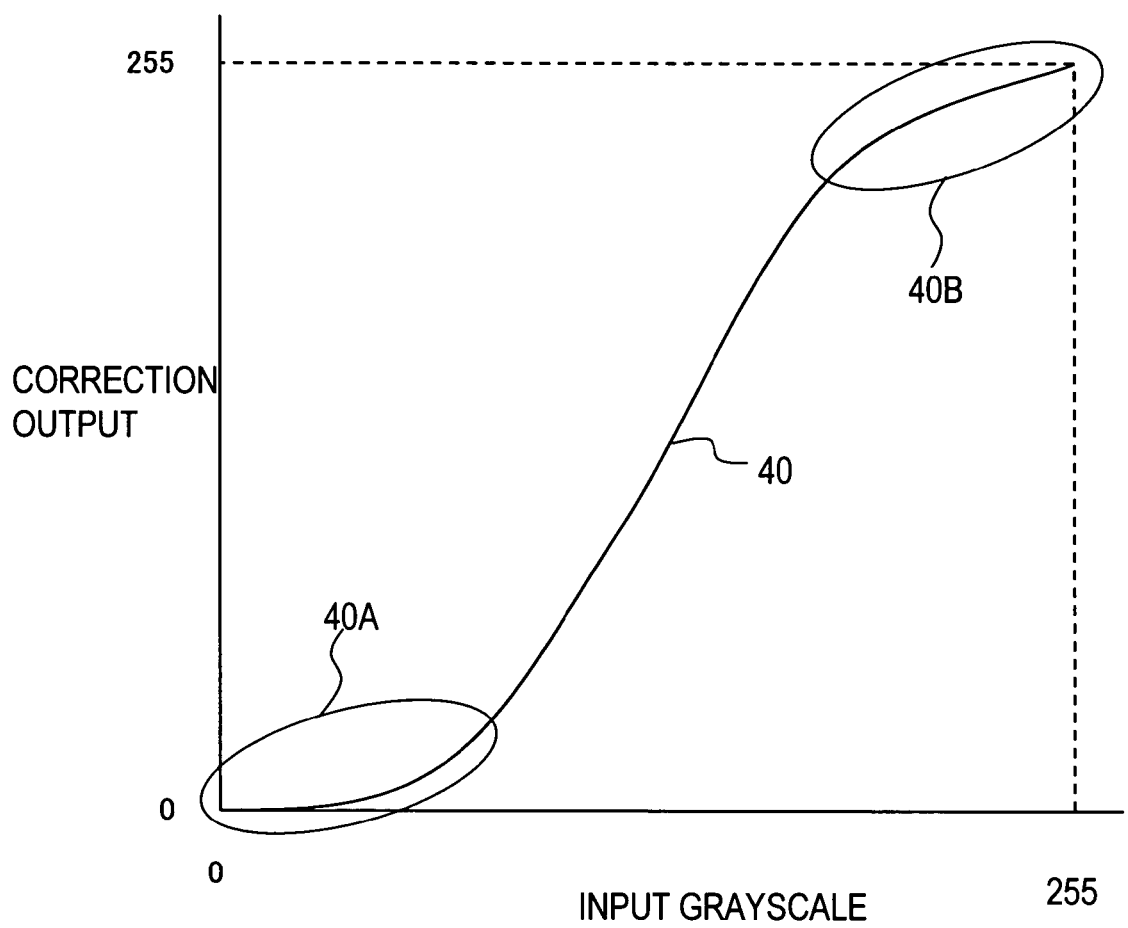
FIG. 7 is a diagram depicting an image processing gamma table for background removal and black enhancement according to the present embodiment.

FIG. 7 is a diagram depicting the image processing gamma table for background removal and black enhancement according to the present embodiment. In the case of a monochrome facsimile, density information is generated in the white part on the paper of the printed medium of an original image. This density information generates dots in the binary data, and drops the image quality and compression rate of the binary data (e.g. white (grayscale 0) repeatability in the case of run length compression). So in order to prevent dot generation in the white area of paper, background removal processing is performed. Also black enhancement processing is performed to improve the quality of black characters. Both of these processings must also be performed considering the characteristics of the scanner 12.

The gamma table 40 shown in FIG. 7 converts the input data such that the corrected output value becomes lower, such as grayscale value 0, when the input is in the low density area 40A, and the corrected output value becomes high, such as grayscale value 255 when the input is in the high density area 40B. Using this gamma table 40, the input multi-grayscale image data 13 is converted into the corrected output, then background removal processing in a low density area and black enhancement processing in a high density area can be performed.

The above image processing for background removal and black enhancement is performed by the same gamma correction unit 16. It is preferable that this image processing gamma table 40 is a fixed table, and the density correction gamma table 34 is a variable table so that readjustment is possible. This is because the correction gamma table 34 includes the non-linear characteristics by hybrid error diffusion and the non-linear characteristics of the print unit, and the non-linear characteristics of the print unit change by age deterioration.

A composite gamma table may be generated by combining the image processing gamma table 40 and the correction gamma table 34 in advance, so that the grayscale values of input multi-grayscale image data is corrected by referring to the composite gamma table. By using the composite gamma table, the number of processing steps in the gamma correction unit can be decreased.

Figure 8:
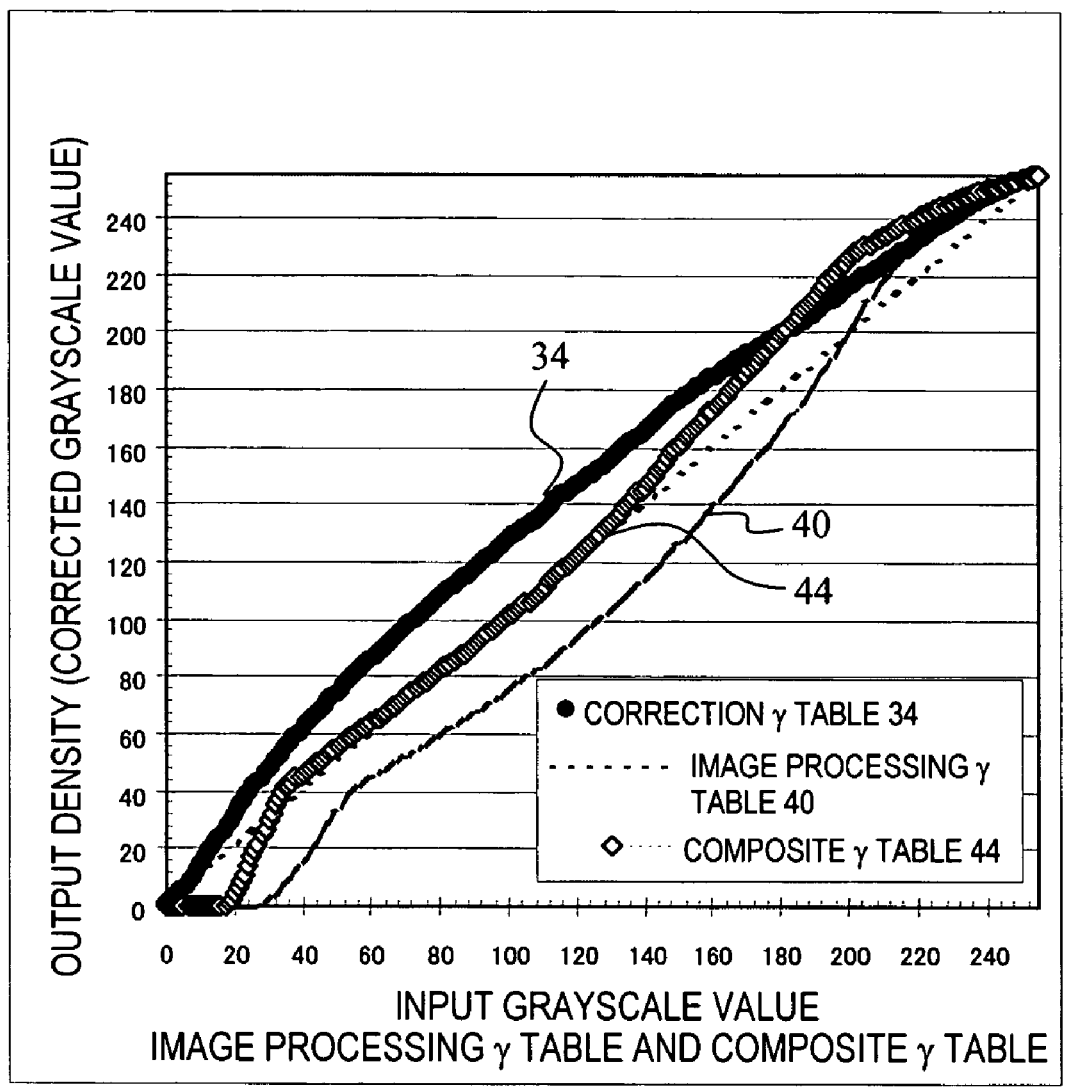
FIG. 8 is a diagram depicting an example of a composite gamma table.

FIG. 8 is a diagram depicting an example of the composite gamma table. In FIG. 8, examples of the density correction gamma table 34 and the image processing gamma table 40 are shown, and the composite gamma table 44 in which these gamma tables are combined is also shown. In order to combine, the output of the image processing gamma table 40 must also be converted into 64-bit real number precision.

FIG. 9 is a block diagram depicting the image processing unit according to the present embodiment. This image processing unit is comprised of an interface IF for receiving the input multi-grayscale image data 13, a central processing unit CPU, a memory 44 for storing a composite gamma table, a memory 50 for storing binary programs, a memory ETM for storing error diffusion matrices, and a work memory 52 which has an image data buffer 54 used for binary processing, and a binary data buffer 56 for storing binary data, and an internal bus BUS for connecting these components.

The image data buffer 54 has three lines of capacity, where two pixels of dummy pixels are added on both sides of the number of pixels in the horizontal direction of the image data, since an error, due to binary processing, is propagated to three rows and five columns of peripheral pixels according to the error diffusion matrix ETM1 shown in FIG. 4. Since the 8 bits of input multi-grayscale image data 13 is converted into 64 bits of corrected multi-grayscale image data by the composite gamma table 44, a capacity to store 64 bits of data is needed for each pixel.

The image processing unit 14 refers to the composite gamma table 44 and converts the input multi-grayscale image data 13 into the corrected multi-grayscale image data. This multi-grayscale image data has floating point real number precision, as described above, and has a data length of 64 bits per pixel. The corrected multi-grayscale image data is temporarily stored in the image data buffer 54. Then the central processing unit CPU of the image processing unit 14 executes the binary program 50, performs binary processing on the corrected multi-grayscale image data based on the hybrid error diffusion, to be converted into binary data "dot present" or "dot absent" for each pixel, and stores the result to the binary data buffer 56. During the binary processing based on the hybrid error diffusion, the error generated by the binary processing is added to the multi-grayscale image data of each pixel in the image data buffer 54, according to the error diffusion matrix ETM, and binary processing is performed for the error-added image data.

Figure 10:
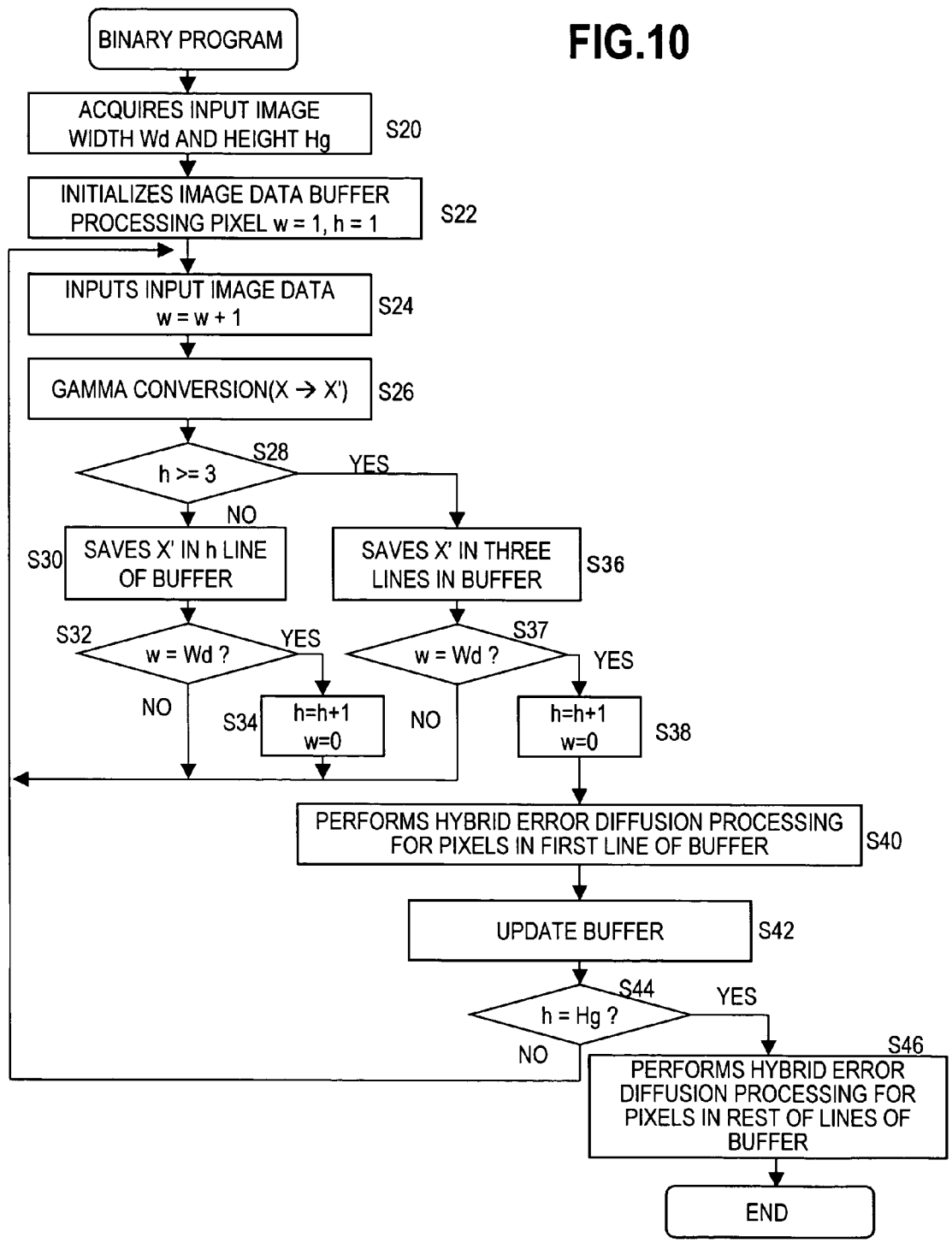
FIG. 10 is a flow chart depicting a binary program according to the present embodiment.
Figure 11:
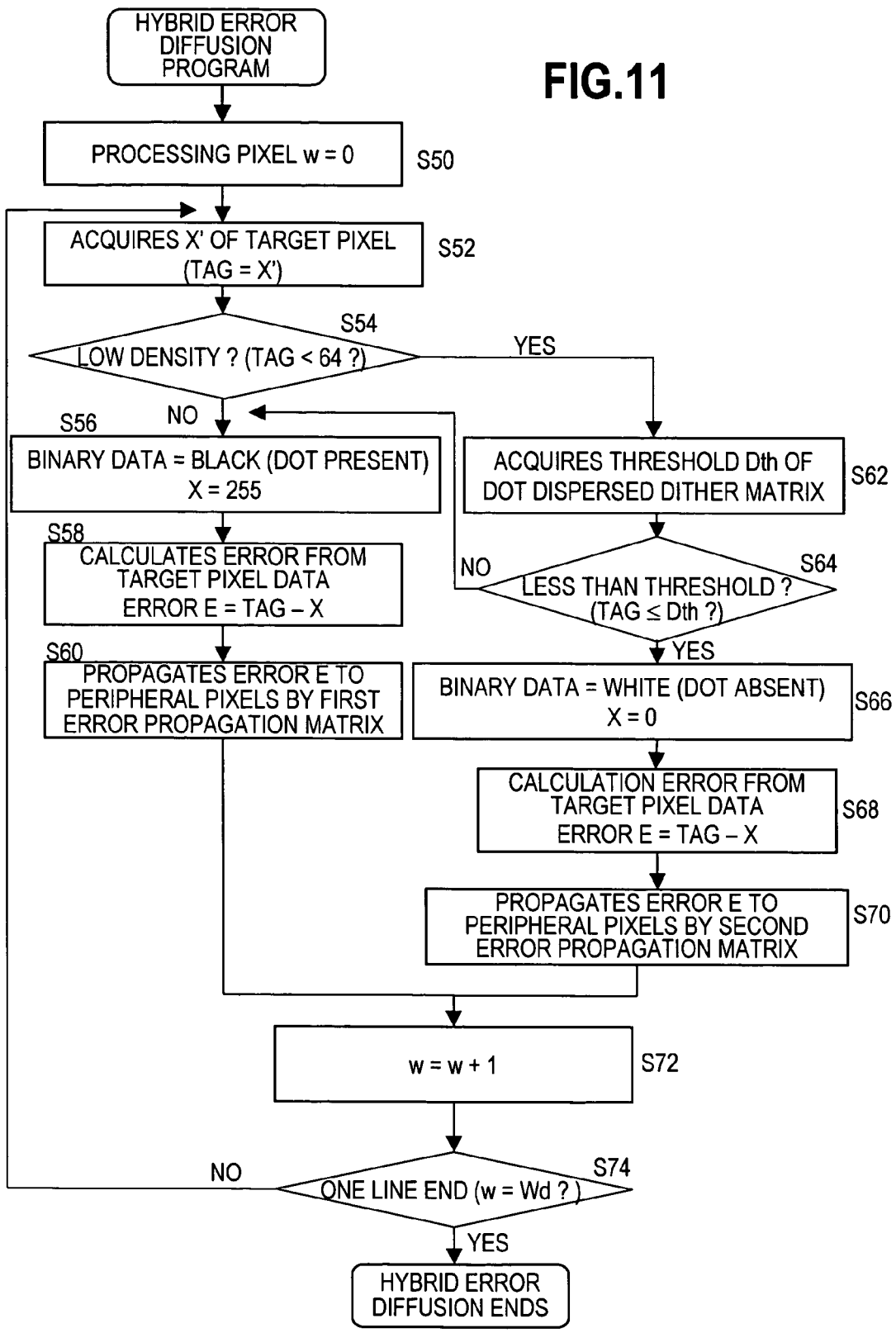
FIG. 11 is a flow chart depicting a binary program according to the present embodiment.

FIG. 10 and FIG. 11 are flow charts depicting the binary program according to the present embodiment. This binary program includes both gamma correction processing and binary processing, but binary processing may be performed on gamma-corrected image data.

The binary program first acquires the width Wd and the height Hg of the input image (S20), secures an area of the width Wd+4 and three lines of height in the image data buffer 54, for initialization (S22). And the program initializes the variables of the processing pixel w and h to w=1 and h=1. These variables w and h indicate the position of the processing target pixel in the image data buffer 54. Then one pixel of the input image data 13 is input, and the variable w is updated to w=w+1 (S24). The input image data 13 is converted into image data, which is corrected referring to the composite gamma table (S26). By this, the input image data X is converted into the corrected image data X'.

The converted image data X' is stored in the h line in the image data buffer (S30). The correction and storage to the image data buffer are repeated until variable h reaches 3 (S28, S32, S34). When variable h reaches 3, the converted image data X' is stored in three lines in the image data buffer (S36, S37, S38). When variable h becomes 3, the converted image data X' is always stored in the third line in the image data buffer thereafter (S36).

When the three lines of corrected image data are stored in the image data buffer, binary processing is performed on the corrected image data in the pixels in the first line in the buffer according to the hybrid error diffusion (S40). This binary processing will be described in detail in FIG. 11. When the binary processing for pixels in the first line completes, the image data buffer is updated (S42). Specifically, in the image data buffer update processing, the image data in the second line and third line is shifted to the first line and second line, and the third line is initialized.

When variable h reaches Hg in the end (S44), image data for the three lines of pixels in the image data buffer is binarized based on hybrid error diffusion (S46), and the binary program ends.

As described above, in the processing in FIG. 10, three lines of corrected image data are stored in the image data buffer 54, and binary processing is performed. During the binary processing, an error, due to the binary processing, is added to the grayscale values of peripheral pixels, and the image data is stored in the image data buffer again. An error buffer may be installed separately, so that the corrected image data is stored in the image data buffer, and an error generated due to binary processing is stored in the error buffer, and binary processing is performed for the grayscale values after corrected image data and errors are added.

Binary processing based on the hybrid error diffusion in FIG. 11 will be described. First the variable w for indicating the position of the processing pixel is initialized to w=0 (S50). And the multi-grayscale image data X' of the target pixel is read from the image data buffer 54, and the variable Tag to indicate the grayscale value of the processing pixel is set to Tag=X' (S52). In this grayscale value Tag, an error propagated after binary processing has been added to the corrected image data.

And it is judged whether the grayscale value Tag of the target pixel is less than 64, which is smaller than ½ of the maximum grayscale value 255 (S54). If the grayscale value Tag of the target pixel is 64 or more (NO in S54), the binary data of this pixel is sorted to "dot present" (black) (S56). In other words, the grayscale value after binary processing is the maximum grayscale value x=255. And the minus error E=Tab−x generated by the binary processing is calculated (S58), and is propagated to peripheral pixels based on the first error diffusion matrix ETM1, and the error E is added to the grayscale values of peripheral pixels (S60). An example of the first error diffusion matrix ETM1 is as shown in FIG. 4. All errors are distributed with the ratio shown in the matrix. By this error diffusion matrix, an error is propagated in a slightly lower right direction.

As described above, if the grayscale value Tag is more than the reference value 64, the pixel is binarized to "dot present", then the generation of texture (worm noise) in an intermediate density area, which is generated in the error diffusion when the threshold is ½ of the maximum grayscale value, that is 127, can be suppressed.

If the grayscale value Tag of the target pixel is less than 64 (YES in S5), on the other hand, the threshold Dth corresponding to the target pixel is acquired from the dot dispersed type dither matrix in FIG. 3 (S62), and it is judged whether the grayscale value Tag of the target pixel is the threshold Dth or less (S64). If the grayscale value Tag of the target pixel exceeds the threshold Dth (NO in FIG. 64), then the binary data of the pixel is sorted to "dot present" (black) (S54), and the minus error E is calculated (S56), and the error E is propagated to peripheral pixels according to the first error diffusion matrix ETM1 (S60). If the grayscale value Tag of the target pixel is less than the threshold Dth (YES in S64), on the other hand, the binary data of the pixel is sorted to "dot absent" (white) (S66). In other words, the grayscale value after binary processing becomes the minimum grayscale value x=0. And the plus error E generated by the binary processing is calculated as E=Tag−x (S68), and the plus error E is propagated to peripheral pixels by the second error diffusion matrix (S70). An example of the second error diffusion matrix ETM2 is as shown in FIG. 4, and a part of the errors is distributed by the ratio shown in the second matrix. By this error diffusion matrix, the error is propagated in a slightly lower left direction.

In this way, in an intermediate or low density area where the grayscale value Tag is less than the reference value, binary processing is performed according to the dot dispersed fixed dither method. This is a fixed dither method, but the minus error generated by the binary processing is propagated to peripheral pixels according to the first error diffusion matrix, considering continuity with the case when the grayscale value Tag is the reference value or more. Because of this, a discontinuous grayscale representation is not generated even if different binary processing is performed, depending on whether the grayscale value is higher or lower than the reference value. The minus error is propagated to peripheral pixels by the second error diffusion matrix of which error diffusion direction and propagation amount are different from the first error diffusion matrix used in the case of the plus error. The present inventor confirmed that the texture of an intermediate or low density area is suppressed by propagating this way. This is considered because plus and minus error diffusion cancel each other.

This binary processing based on hybrid error diffusion is repeated until variable w, to indicate the position of the processing pixel, reaches w=Wd (S72, S74). Now the binary processing based on hybrid error diffusion for one line is completed.

[High-Speed Processing by Converting Grayscale Value into Fixed Point Bit Format]

In the above mentioned embodiment, the grayscale value after correction is in a floating point bit format (64 bit, double precision) to improve correction precision by the composite gamma table. However the processing of dividing the real number in the floating point bit format by 48 for error diffusion requires many processing steps for a computer. Therefore to implement high-speed processing, the grayscale value is converted into an integer of a fixed point bit format (16 bit, −32767 to +32767), and the ratio of the error diffusion matrix is set to a ratio divided by a power of 2.

In other words, the thresholds in the dot dispersed threshold matrix are normalized from 8 bits to 16 bits (0 to 32767), and the composite gamma table in real number precision is also normalized to 16 bits (0 to 21767) in advance. These are positive integers, so a negative integer area in 16 bits (−32767 to −1) is not used. Also each pixel in the image data buffer is set to a 16-bit capacity. The reference value 64 for low density area judgment is normalized to a reference value in a 0 to 32767 range, that is 8224 (64×32767/255), and the propagation error is propagated in 16 bits (maximum $2^{16}/2-1=-32767$ to $+32767$).

Figure 12:
FIG. 12 shows an example of a first error diffusion matrix for high-speed processing.

And when the error is propagated according to the first error diffusion matrix, the error diffusion matrix where an error is arranged in the ratio of n/a power of 2 (n is an integer), is used. FIG. 12 shows an example of the first error diffusion matrix distributed with a ratio $n/5^{th}$ power of 2 (64). In this example, all errors are propagated in the lower right direction, just like the first error diffusion matrix ETM1 in FIG. 4. According to this, an error to be propagated is a value when the error generated by binary processing (Tag−x) is divided by 64 and multiplied by an integer (9, 7, 4 times). Therefore the binary data of an error generated in the error diffusion processing is divided by 64 using the processing to shift 6 bits to the right, and the result is multiplied by a respective integer, so the error to be propagated can be easily determined, and the number of processing steps by the processor can be decreased.

For a plus error, the second error diffusion matrix WETM2 in FIG. 4 can be used directly. In this example, the binary data of the generated error can be shifted 4 bits to the right and divided by 16. By using a fixed point bit format and using a right shift for the calculation of a distributed error, the number of processing steps in an operation can be considerably decreased.

[Comparison of Binary Processing Result]

The binary processing result by hybrid error diffusion according to the present embodiment and the binary processing result by the conventional fixed dither method and error diffusion method are compared. The first comparison example is the case when the original image in an intermediate or high density area is binarized to "dot present", and the error is diffused, and the original image in an intermediate or low density area is binarized by the threshold matrix based on the dither method. In this first comparison example, the error which is generated after binary processing is not propagated by the dither method in the intermediate or low density area. In the second comparison example, the original image in the intermediate or high density area is binarized to "dot present", and the error is propagated, and the original image in the intermediate or low density area is binarized by the threshold matrix based on the dither method, and the error is also propagated.

[First Comparison Example]

FIG. 13 and FIG. 14 show the original image (A) and the binary processing result of the dot dispersed fixed dither (B), error diffusion (C) and hybrid error diffusion (D) of the patch image in an intermediate density area. In the original image (A), patch patterns with grayscale values 68, 69 and 70 are arranged at the top, and patch patterns with grayscale values 84, 85 and 86 are arranged at the bottom. According to the diffusion of a minus error caused by binary processing based on a low reference value, grayscale values of many pixels becomes less than the reference value during binary processing. Therefore the result of the dispersed dither method in a low or intermediate density area and error diffusion processing thereof, and the continuity of the boundary section of the dispersed dither method and error diffusion method in an intermediate density area, can be compared. In the dot dispersed fixed dither method (B), a relatively large texture (worm noise) is seen. In the error diffusion method (C), a delay of dot generation when processing is started and a large texture (worm noise) are seen. Whereas in the present embodiment (D), the warm noise unique to error diffusion is suppressed, but an unevenness in an area where the dot density is low stands out, since the continuity of error diffusion does not exist.

FIG. 15 shows the original image (A) and the binary processing result of the dot dispersed fixed dither (B), error diffusion (C) and hybrid error diffusion (D) for characters. In the dot dispersed fixed dither method (B), the missing of dots in characters stands out, and visibility is low, as expected. In the error diffusion method (C), the missing of dots is minor, and visibility is high. In the present embodiment (D) as well, the missing of dots is minor, and visibility has been improved, just like the error diffusion method.

FIG. 16 shows the original image (A) and the binary processing result of the error diffusion (C), and the hybrid error diffusion (D) for a patch pattern having a low density area. In the error diffusion method (C), the delay of dot generation occurred in the low density area (area 60), as expected. Whereas in the present embodiment (D) where the low density area is binarized by the dot dispersion fixed dither method, the delay of dot generation does not occur.

[Second Comparison Example]

FIG. 17 and FIG. 18 show the original image (A) and the binary processing result of the dot dispersed type fixed dither (B), error diffusion (C) and the hybrid error diffusion (D). In the original image (A), patch patterns with grayscale values 68, 69 and 70 are arranged at the top, and patch patterns with grayscale values 84, 85 and 86 are arranged at the bottom. In the diffusion of a minus error caused by binary processing based on a low reference value, the grayscale values of many pixels become less than the reference value during binary processing. Therefore the dispersed dither method in a low or intermediate density area and the error diffusion process result thereof, and the continuity of the boundary section of the dispersed dither method and the error diffusion method in an intermediate density area can be compared. In the dot dispersed fixed dither method (B), a relatively large texture (worm noise) can be seen. In the error diffusion method (C), the delay of dot generation when processing is started and a large texture (worm noise) can be seen. Whereas in the present embodiment (D), texture is suppressed, and image quality is improved because of the continuity of error diffusion.

FIG. 19 shows the original image (A) and the binary processing result of the dot dispersed fixed dither (B), error diffusion (C), and the hybrid error diffusion (D) for characters. In the dot dispersed fixed dither method (B), the missing of dots in characters stands out, and visibility is low, as expected. In the error diffusion method (C), the missing of dots is minor, and visibility is high. In the present embodiment (D) as well, the missing of dots is minor, and visibility has been improved, just like the error diffusion method.

FIG. 20 shows the original image (A), and the binary processing result of the error diffusion (C), and the hybrid error diffusion (D) for a patch pattern having a low density area. In the error diffusion method (C), the delay of dot generation occurred in a low density area (area 60), as expected. Whereas in the present embodiment (D), where the low density area is binarized by the dot dispersed fixed dither method, the delay of dot generation does not occur.

As described above, according to the present embodiment, the original image is binarized by the dot dispersed fixed dither method in an intermediate and low density area, and is binarized to "dot present", and a minus error generated thereby is propagated by the first error diffusion matrix in an intermediate or high density area, so the delay of dot generation in a low density area and the generation of texture (worm noise) generated in an intermediate density area, which occur in the case of the error diffusion method, can be suppressed.

Further, according to the present embodiment, the original image is binarized by the dot dispersed fixed dither method in an intermediate or low density area, where for minus errors generated by binary processing, all the errors are propagated by a first error diffusion matrix, and for plus errors, a part of the errors is propagated by a second error diffusion matrix, so the generation of texture by error diffusion can be suppressed. Further in an intermediate or high density area, the minus errors generated after being binarized into "dot present" are propagated by the first error diffusion matrix, so the generation of texture (worm noise), which is generated in an intermediate density area when the error diffusion method is used, can be suppressed.

What is claimed is:

1. An image processor for converting input image data that has multi-grayscale image data for each pixel with a predetermined resolution into binary data for each of said pixels, comprising:
   a binary unit, wherein
      if a grayscale value of multi-grayscale image data of a processing target pixel is lower than a reference value, which is less than ½ of a maximum grayscale value of said multi-grayscale image data, said binary unit performs a first binary processing for converting the input image data of said processing target pixel into binary data of "dot present" or "dot absent" based on a threshold matrix, in which a plurality of threshold values are dispersed without concentrating a plurality of low threshold values, and if the grayscale value of the multi-grayscale image data of the processing target pixel is higher than said reference value, said binary unit performs a second binary processing for converting the input image data of said processing target pixel into binary data of "dot present", and an error diffusion processing for adding an error between the grayscale value of said processing target pixel and the maximum grayscale value to said multi-grayscale image data of peripheral pixels based on a first error diffusion matrix.

2. The image processor according to claim 1, wherein said binary unit performs an error diffusion processing for adding an error of the processing target pixel, for which said first binary processing is performed, to said multi-grayscale image data of peripheral pixels, along with said first binary processing.

3. The image processor according to claim 1, wherein said binary unit performs an error diffusion processing for adding an error of the processing target pixel binarized to "dot present" in said first binary processing to said multi-grayscale image data of peripheral pixels based on said first error diffusion matrix.

4. The image processor according to claim 3, wherein said first error diffusion matrix propagates all of said errors to peripheral pixels positioned in a first direction from the processing target pixel with higher weight.

5. The image processor according to claim 1, wherein said binary unit performs an error diffusion processing for adding an error of the processing target pixel binarized to "dot absent" in said first binary processing to said multi-grayscale image data of peripheral pixels based on a second error diffusion matrix.

6. The image processor according to claim 5, wherein said second error diffusion matrix propagates a part of said errors to peripheral pixels positioned in a second direction from the processing target pixel with higher weight.

7. The image processor according to claim 1, further comprising a gamma correction processing unit for correcting the input image data having multi-grayscale image data for each of said pixels by correcting non-linear characteristics between a grayscale value of the input image data and a grayscale value of an image reproduced by binary data, which are generated in accordance with binary processing by said binary unit, wherein corrected input image data, corrected by said gamma correction processing unit, is binarized by said binary unit.

8. The image processor according to claim 7, wherein said gamma correction processing unit further performs dot removal correction for correcting said input image data to be lower density grayscale in a low density grayscale area, and black enhancement correction for correcting said input image data to be higher density grayscale in a high density grayscale area.

9. The image processor according to claim 8, wherein said gamma correction processing unit corrects said input image data based on a composite correction table where said non-linear characteristics correction, said dot removal correction and said black enhancement correction are combined.

10. The image processor according to claim 1, wherein the multi-grayscale data of the processing target pixel is processed by a binary data format which is made of a plurality of bits, and in said error diffusion processing, an error to be propagated is calculated by shifting said multi-grayscale data to the right by a predetermined number of bits.

11. A computer readable medium storing an image processing program for converting input image data that has multi-grayscale image data for each pixel with a predetermined resolution into binary data for each of said pixels, wherein if a grayscale value of multi-grayscale image data of a processing target pixel is lower than a reference value, which is less than ½ of a maximum grayscale value of said multi-grayscale image data, the program causes a computer to perform a first binary processing step of converting the input image data of said processing target pixel into binary data of "dot present" or "dot absent" based on a threshold matrix, in which a plurality of threshold values are dispersed without concentrating a plurality of low threshold values, and if the grayscale values of the multi-grayscale image data of the processing target pixel is higher than said reference value, the program causes the computer to perform a second binary processing step of converting the input image data of said processing target pixel into binary data of "dot present", and an error diffusion processing step of adding an error between the grayscale value of said processing target pixel and the maximum grayscale value to said multi-grayscale image data of peripheral pixels based on a first error diffusion matrix.

12. An image processor for converting input image data, that has multi-grayscale image data for each pixel with a predetermined resolution, into binary data for each of the pixels, comprising:

a binary unit, which performs a binary processing for converting the input image data of the processing target pixel into binary data of "dot present" or "dot absent" based on a threshold matrix, in which a plurality of threshold values are arranged, and an error diffusion processing for adding an error between the input grayscale value of the "dot present" pixel and the maximum grayscale value to the multi-grayscale image data of peripheral pixels based on a first error diffusion matrix, and adding an error between the input grayscale value of the pixel of "dot absent" and the minimum grayscale value to the multi-grayscale image data of peripheral pixels based on a second error diffusion matrix which is different from the first error diffusion matrix.

13. The image processor according to claim 12, wherein for the first error diffusion matrix, the error is propagated to peripheral pixels positioned in a first direction from the processing target pixel with a higher weight, and for the second error diffusion matrix, the error is propagated to peripheral pixels in a second direction, which is different from the first direction from the processing target pixel with a higher weight.

14. The image processor according to claim 12, wherein for the first error diffusion matrix, all the errors are propagated to peripheral pixels, and for the second error diffusion matrix, a part of the errors is propagated to peripheral pixels.

15. The image processor according to claim 12, wherein if a grayscale value of the multi-grayscale image data of a processing target pixel is lower than a reference value, which is less than ½ of a maximum grayscale value of the multi-grayscale image data, the binary unit performs binary processing based on the threshold matrix, and if a grayscale value of the multi-grayscale image data of a processing target pixel is higher than the reference value, the binary unit converts the input image data of the processing target pixel into the binary data "dot present", and adds the error to the multi-grayscale image data of the peripheral pixels based on the first error diffusion matrix.

16. The image processor according to claim 12, wherein in the threshold matrix, a plurality of threshold values are dispersed without concentrating a plurality of low threshold values.

17. The image processor according to claim 1, wherein the multi-grayscale data of the processing target pixel is processed by a binary data format which is made of a plurality of bits, and in said error diffusion processing, an error to be propagated is calculated by shifting said multi-grayscale data to the right by a predetermined number of bits.

18. An image processor for converting input image data, that has multi-grayscale image data for each pixel with a predetermined resolution, into binary data for each of the pixels, comprising:
 a binary unit, wherein
 if a grayscale value of the multi-grayscale image data of a processing target pixel is lower than a reference value, which is less than ½ of a maximum grayscale value of the multi-grayscale image data, the binary unit performs binary processing for converting the input image data of the processing target pixel into the binary data of "dot present" or "dot absent" based on the threshold matrix, in which a plurality of threshold values are dispersed without concentrating a plurality of low threshold values, and the binary unit performs an error diffusion processing for adding an error of the processing target pixel generated by the binary processing to the multi-grayscale image data of peripheral pixels.

19. The image processor according to claim 18, wherein in the error diffusion processing, the binary unit adds the error of the pixel of "dot present" to the multi-grayscale image data of peripheral pixels based on a first error diffusion matrix, and adds the error of the pixel with "dot absent" to the multi-grayscale image data of peripheral pixels based on a second error diffusion matrix, which is different from the first error diffusion matrix.

20. The image processor according to claim 19, wherein the multi-grayscale data of the processing target pixel is processed by a binary data format which is made of a plurality of bits, and in said error diffusion processing, an error to be propagated is calculated by shifting said multi-grayscale data to the right by a predetermined number of bits.

21. A computer readable medium storing an image processing program for converting input image data, that has multi-grayscale image data for each pixel with a predetermined resolution, into binary data for each of the pixels, the image processing program causing a computer to perform:
 a binary processing step of converting the input image data of the processing target pixel into binary data of "dot present" or "dot absent" based on a threshold matrix, in which a plurality of threshold values are arranged, and
 an error diffusion processing step of adding an error between the input grayscale value of the "dot present" pixel and the maximum grayscale value to the multi-grayscale image data of peripheral pixels based on a first error diffusion matrix, and adding an error between the input grayscale value of the pixel of "dot absent" and the minimum grayscale value to the multi-grayscale image data of peripheral pixels based on a second error diffusion matrix which is different from the first error diffusion matrix.

22. A computer readable medium storing an image processing program medium for converting input image data, that has multi-grayscale image data for each pixel with a predetermined resolution, into binary data for each of the pixels, the image processing program causing a computer to perform:
 if a grayscale value of the multi-grayscale image data of a processing target pixel is lower than a reference value, which is less than ½ of a maximum grayscale value of the multi-grayscale image data, a binary processing step of converting the input image data of the processing target pixel into the binary data of "dot present" or "dot absent" based on the threshold matrix, in which a plurality of threshold values are dispersed without concentrating a plurality of low threshold values, and an error diffusion processing step of adding an error of the processing target pixel generated by the binary processing to the multi-grayscale image data of peripheral pixels.

23. An image processor for converting input image data, that has multi-grayscale image data for each pixel with a predetermined resolution, into binary data for each of the pixels, comprising:
 a binary unit, wherein
 if a grayscale value of the multi-grayscale image data of a processing target pixel is lower than a reference value, which is less than ½ of a maximum grayscale value of the multi-grayscale image data, said binary unit performs
 a first binary processing for converting the input image data of the processing target pixel into the binary data of "dot present" or "dot absent" based on the threshold matrix, in which a plurality of threshold values are dispersed without concentrating a plurality of low threshold values, and a first error diffusion processing for adding an error between the input grayscale value of the "dot present" pixel and the maximum grayscale value to the multi-grayscale image data of peripheral pixels based on a first error diffusion matrix, and adding an error between the input grayscale value of the pixel of "dot absent" and the minimum grayscale value to the multi-grayscale image data of peripheral pixels based on a second error diffusion matrix which is different from the first error diffusion matrix,
 if the grayscale values of the multi-grayscale image data of the processing target pixel is higher than said reference value, the binary unit performs
 a second binary processing for converting said processing target pixel into binary data of "dot present", and a second error diffusion processing for adding an error between the input grayscale value of said processing target pixel and the maximum grayscale value to said multi-grayscale image data of peripheral pixels based on a first error diffusion matrix.

24. The image processor according to claim 23,
 wherein for the first error diffusion matrix, the error is propagated to peripheral pixels positioned in a first direction from the processing target pixel with a higher weight, and for the second error diffusion matrix, the error is propagated to peripheral pixels in a second direction, which is different from the first direction from the processing target pixel with a higher weight,
 wherein for the first error diffusion matrix, all the errors are propagated to peripheral pixels, and for the second error diffusion matrix, a part of the errors is propagated to peripheral pixels.

* * * * *